June 19, 1956     E. B. NOLT     2,750,877
AUTOMATIC PICK-UP BALERS
Filed Sept. 6, 1950     14 Sheets-Sheet 10
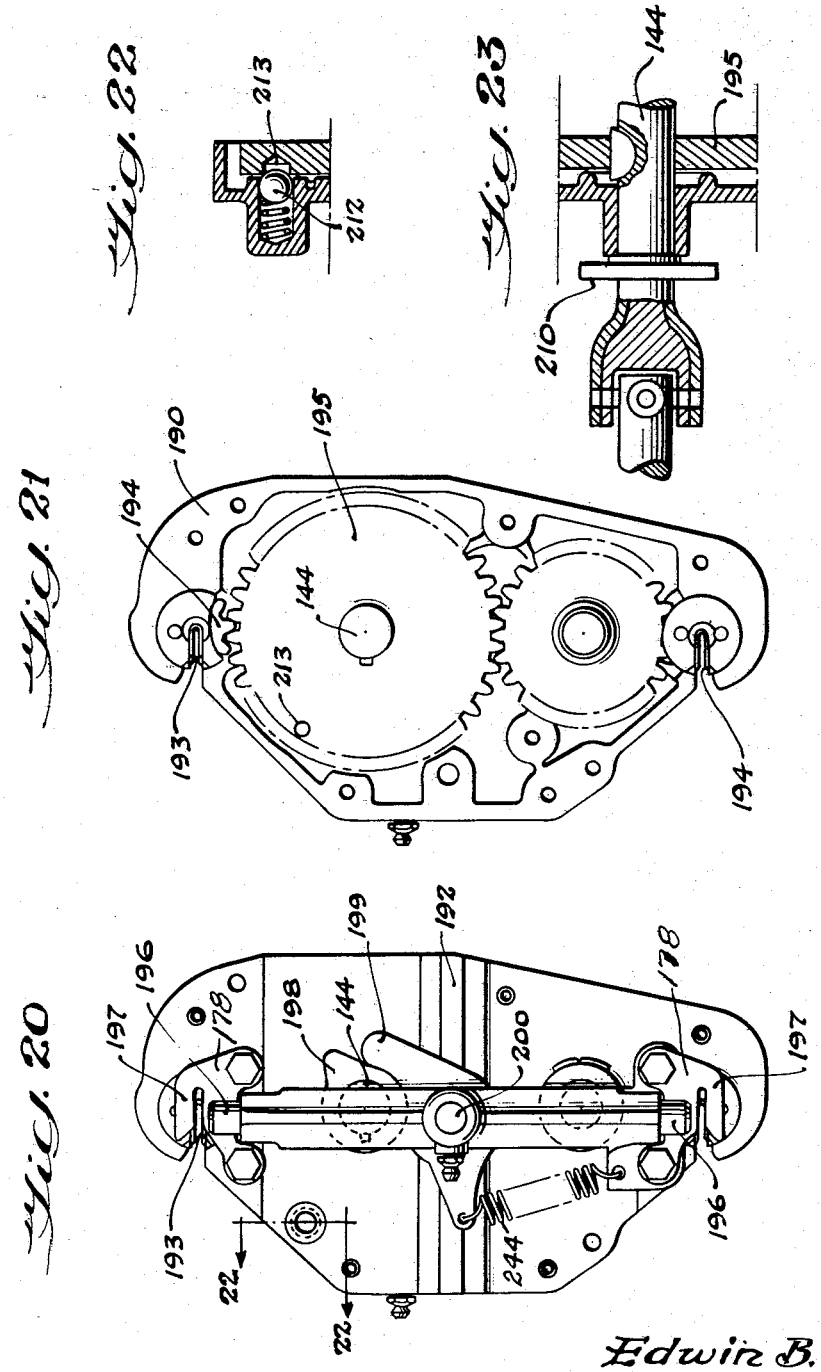
INVENTOR
*Edwin B. Nolt*
BY *Allan R. Redrow*
ATTORNEY

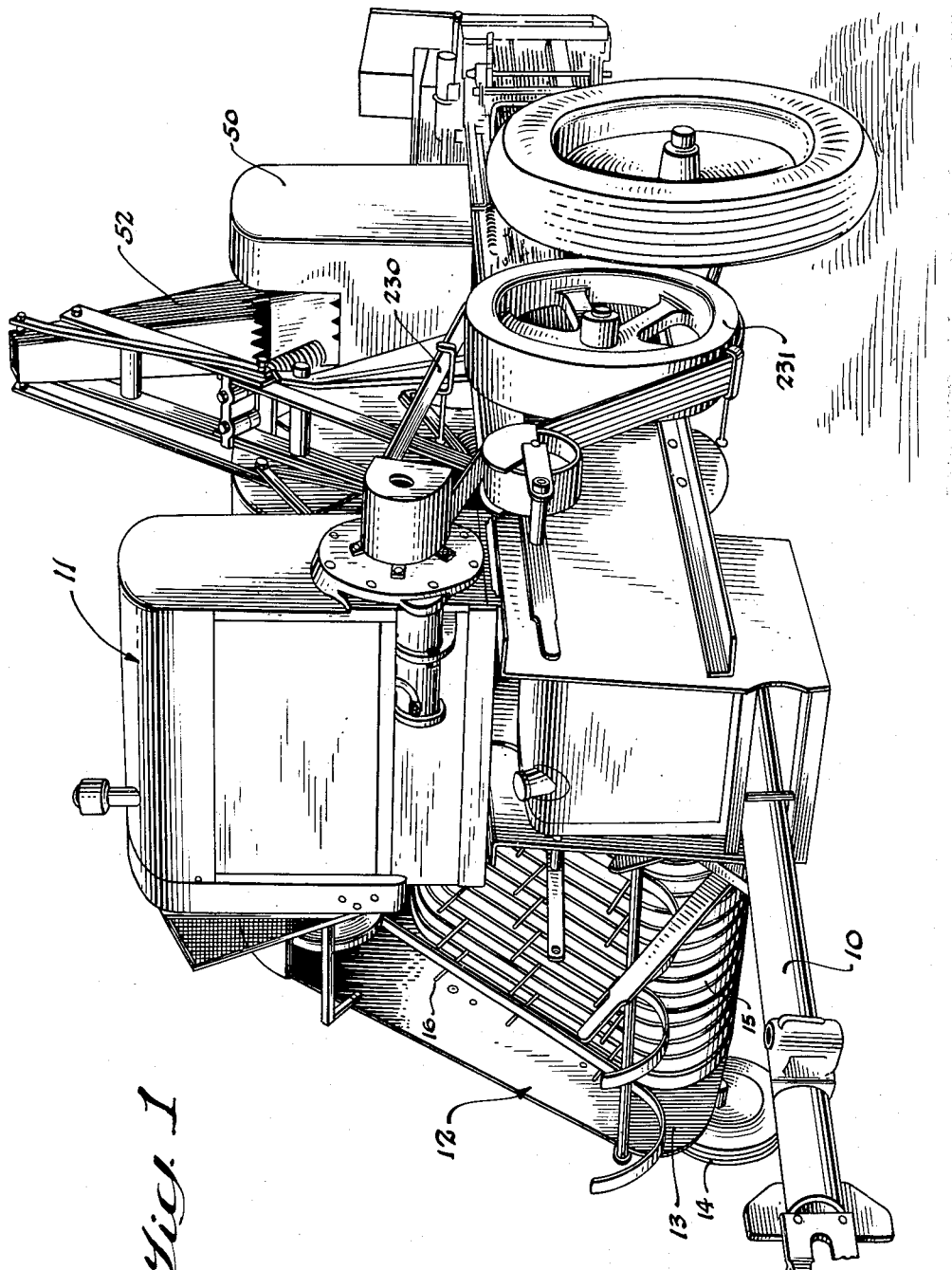

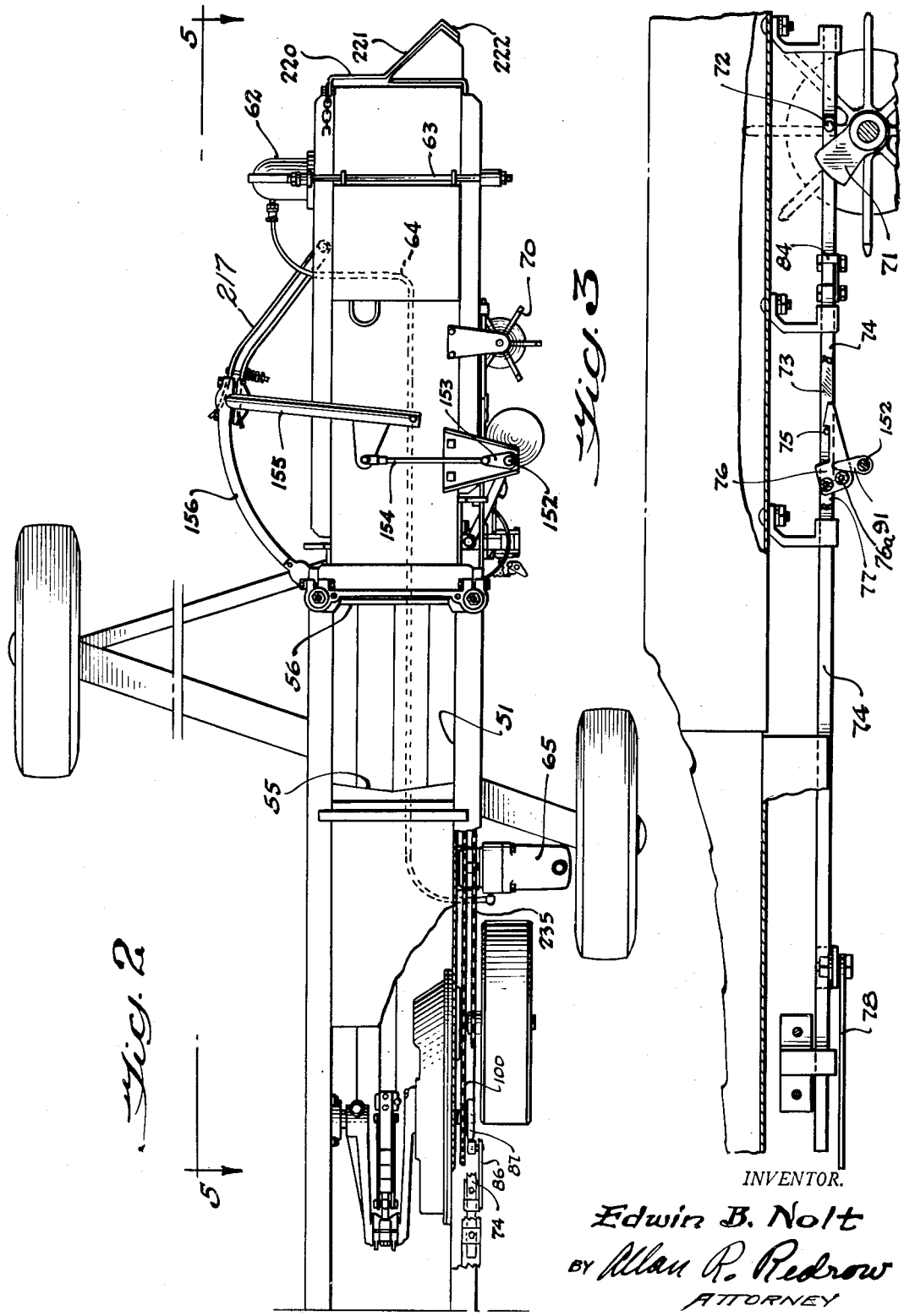

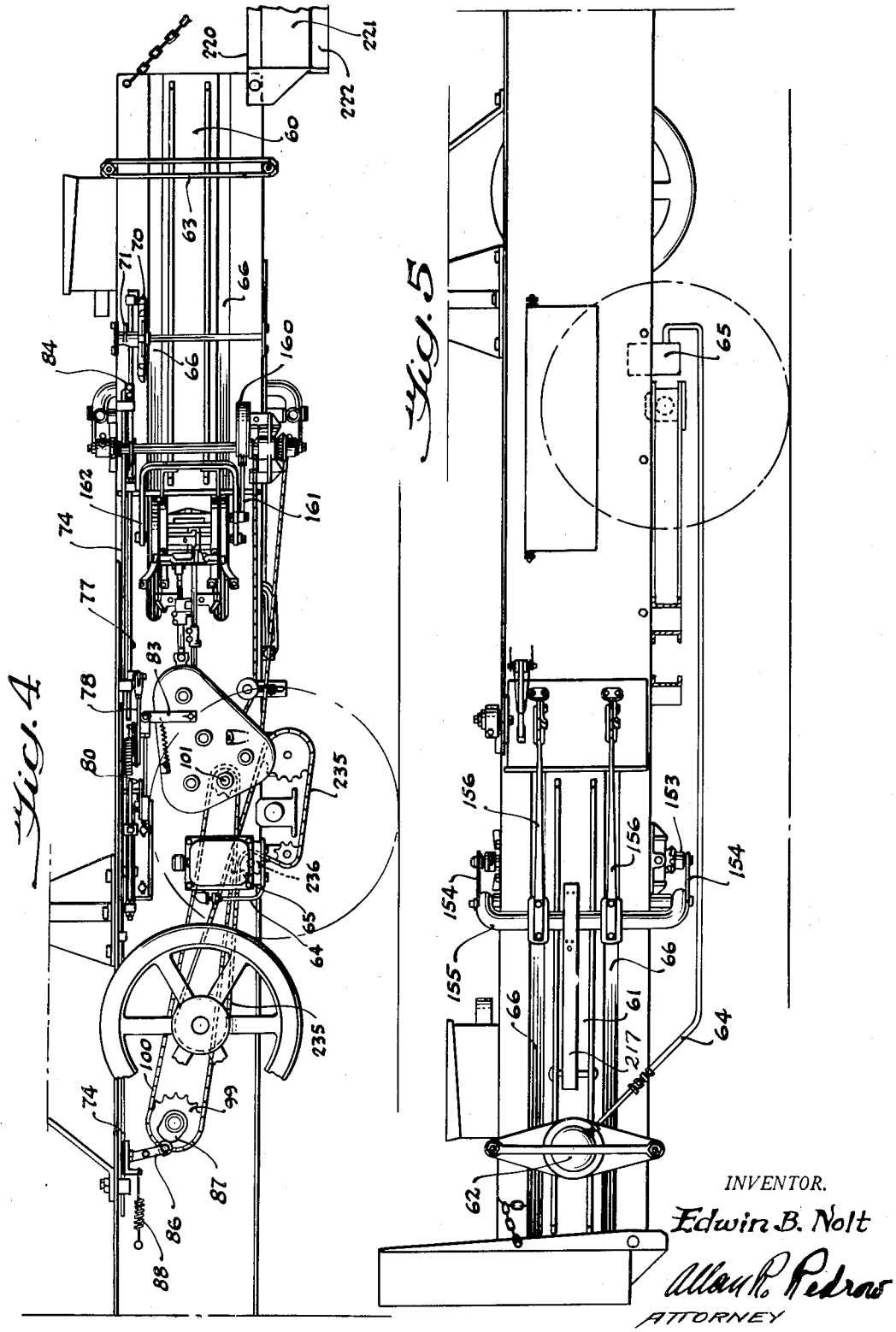

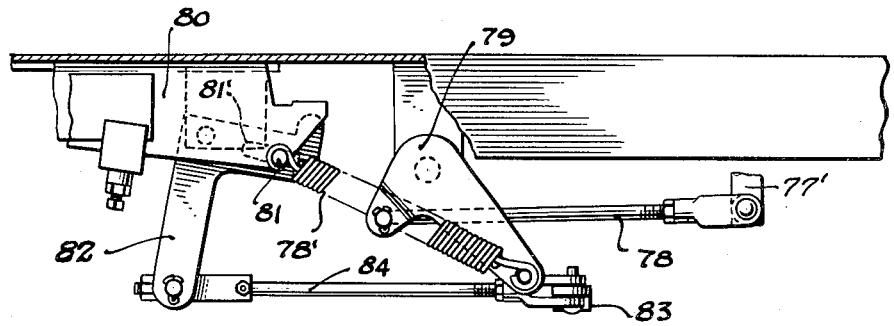
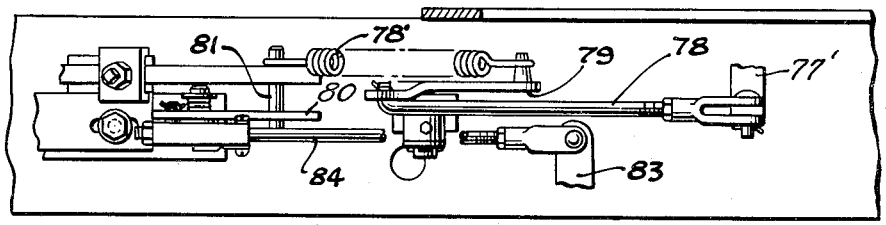
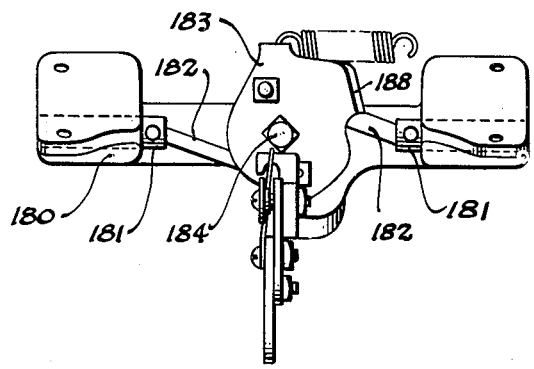 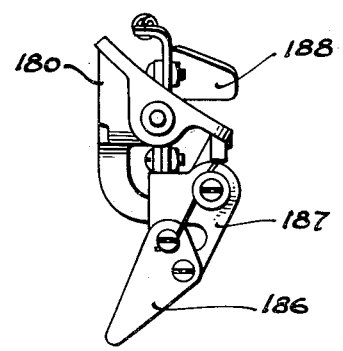

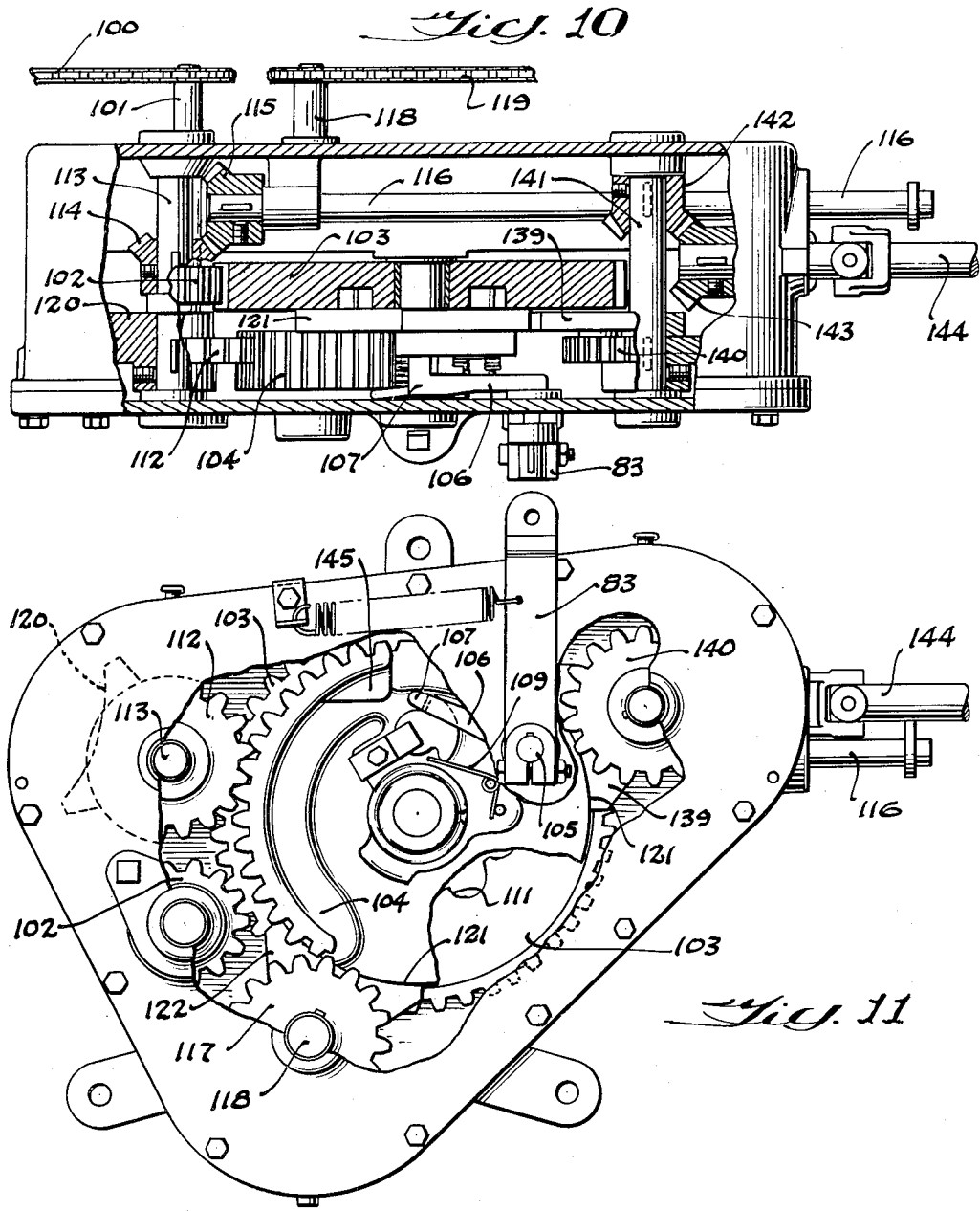

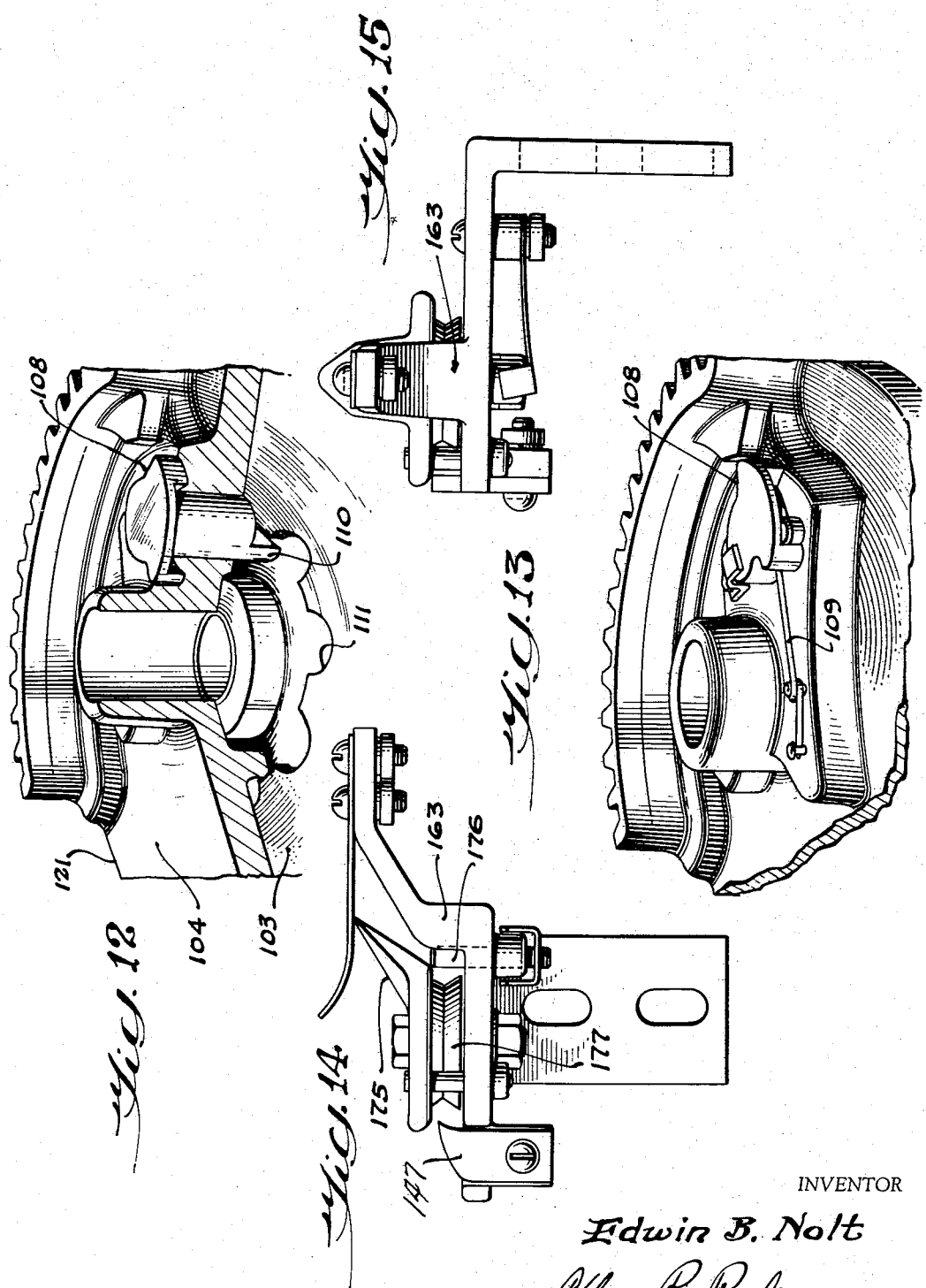

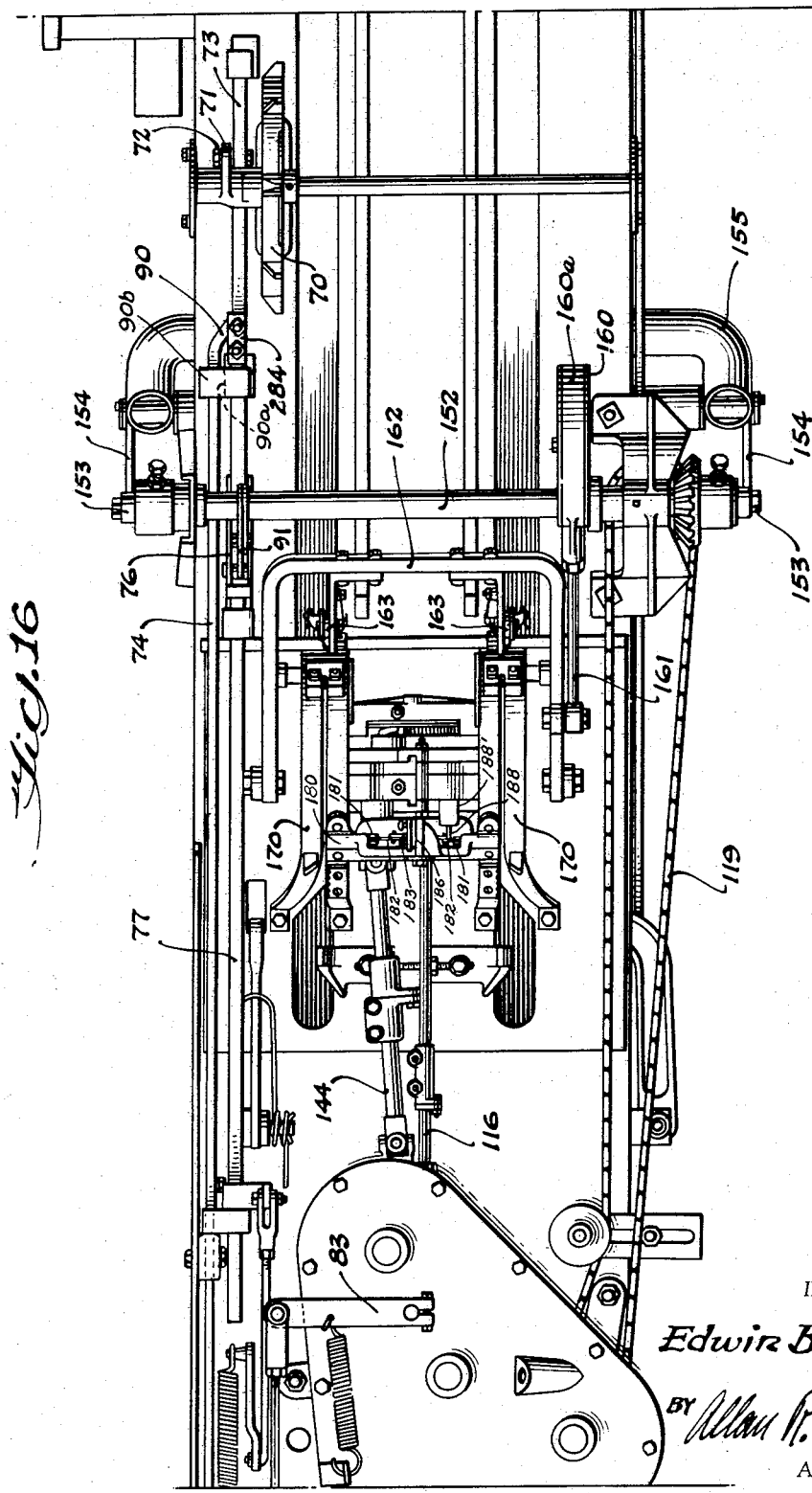

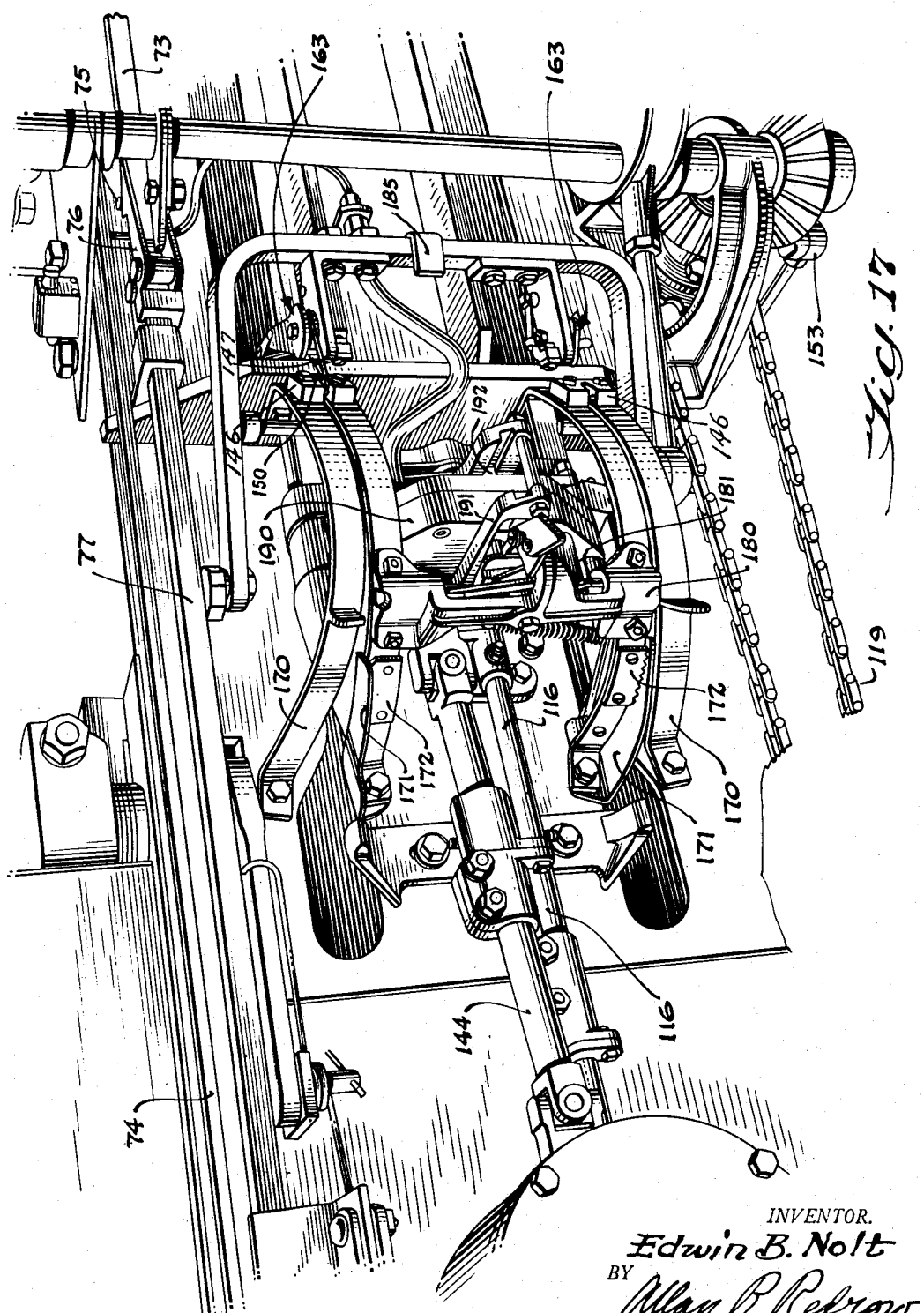

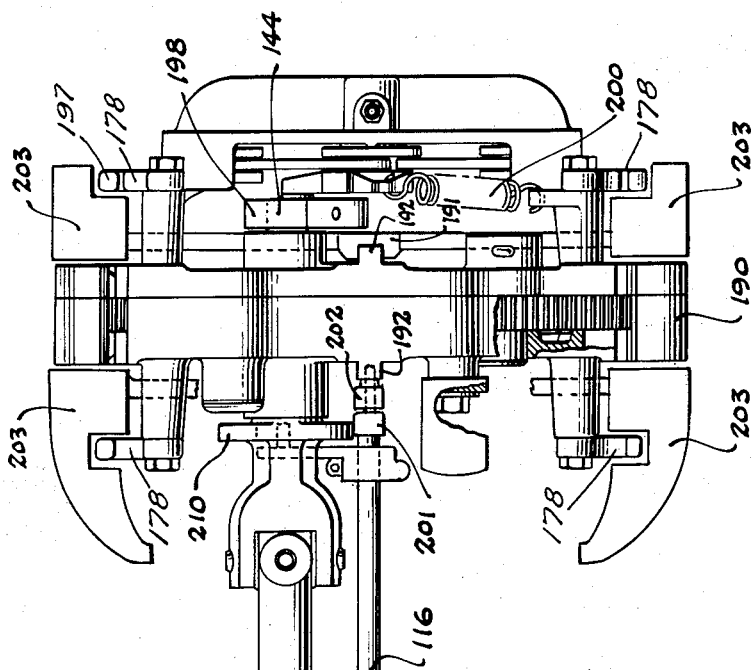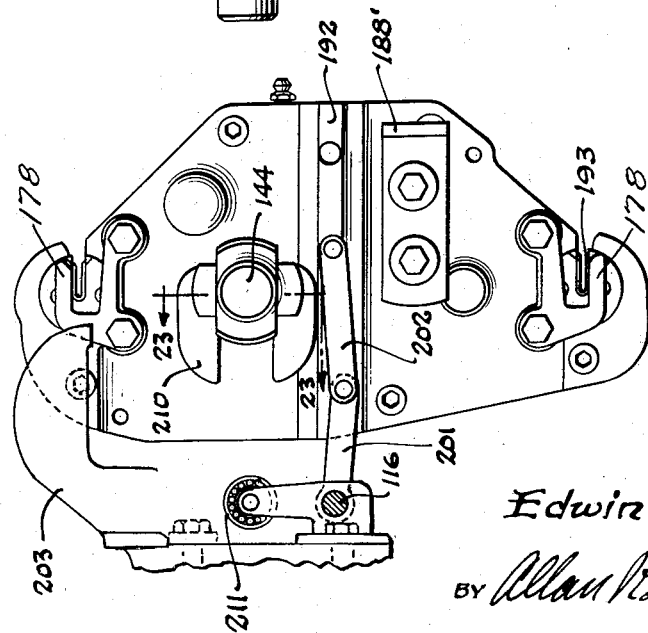

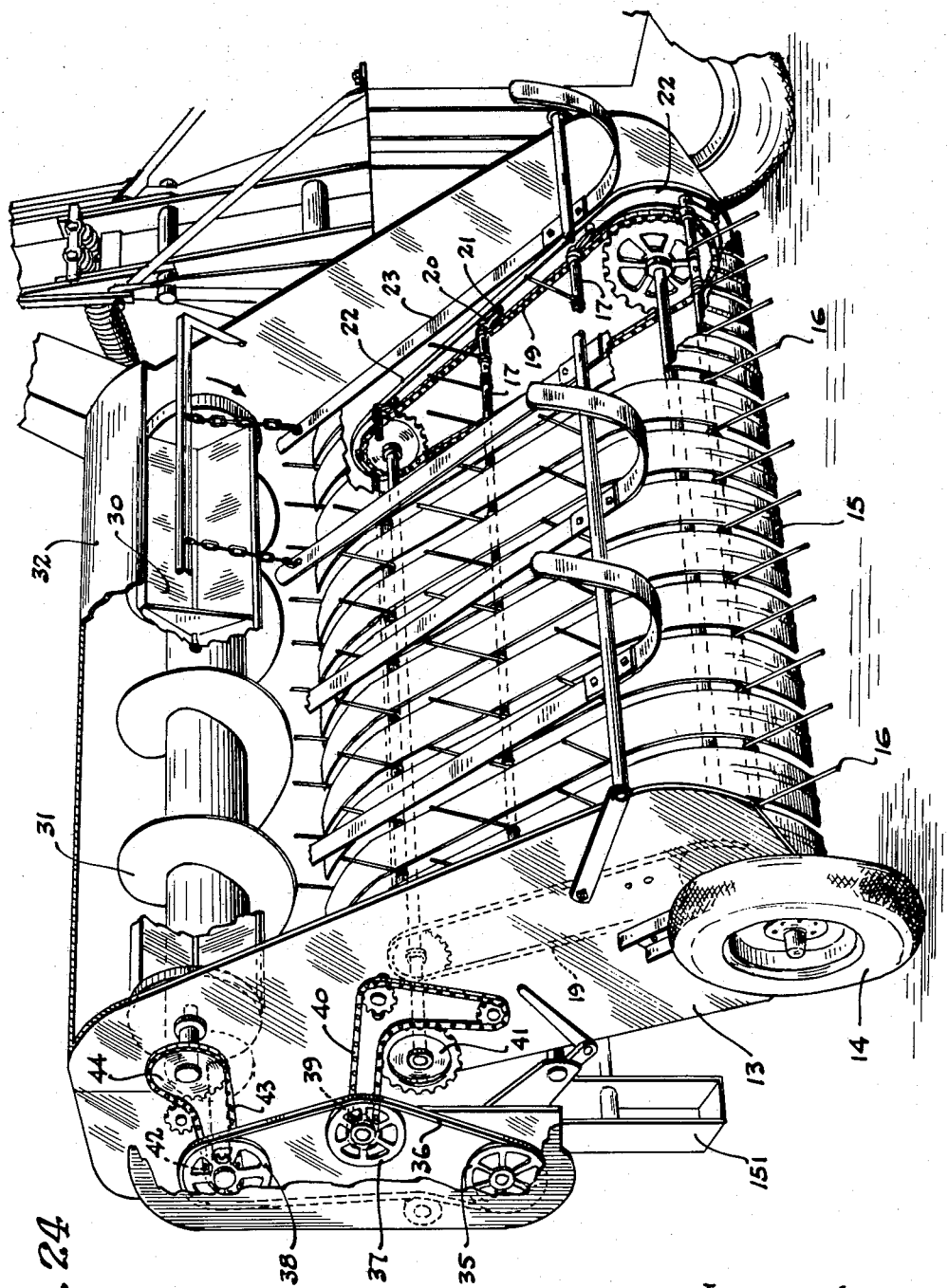

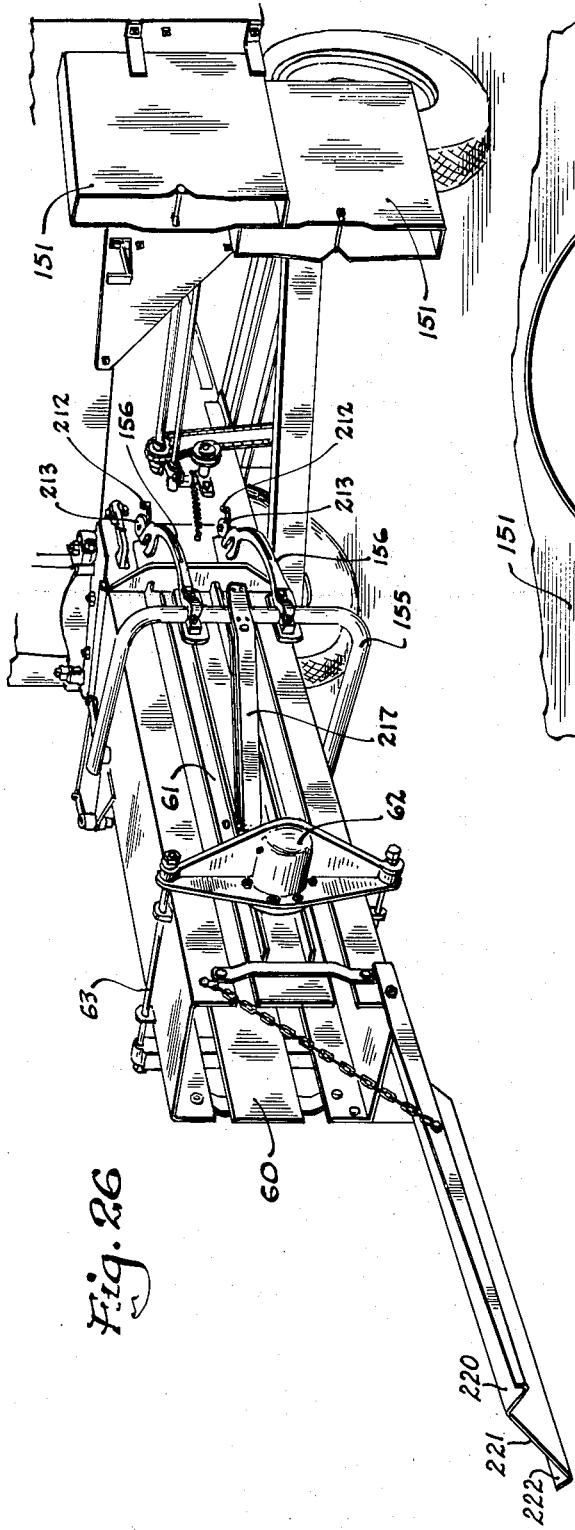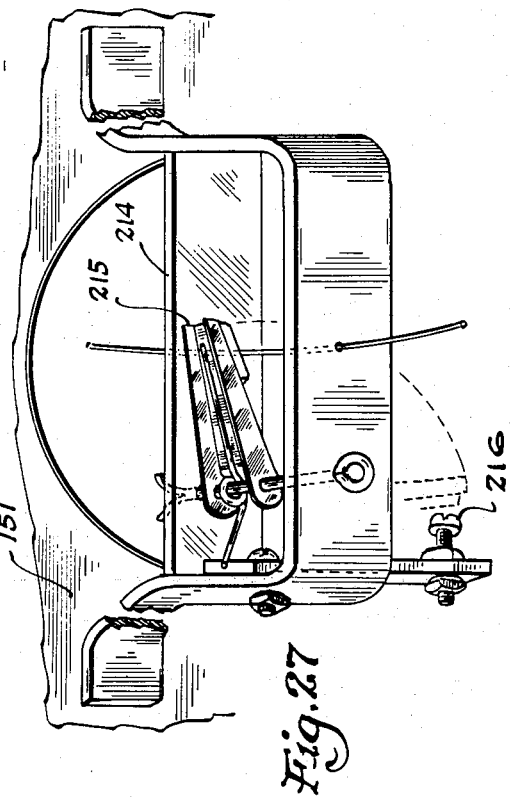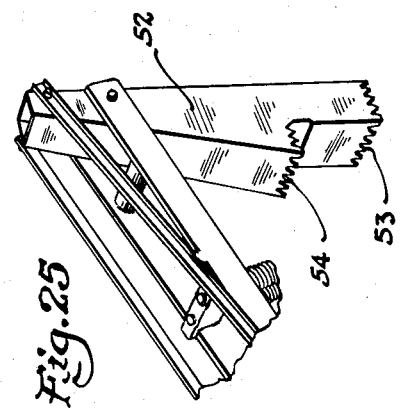

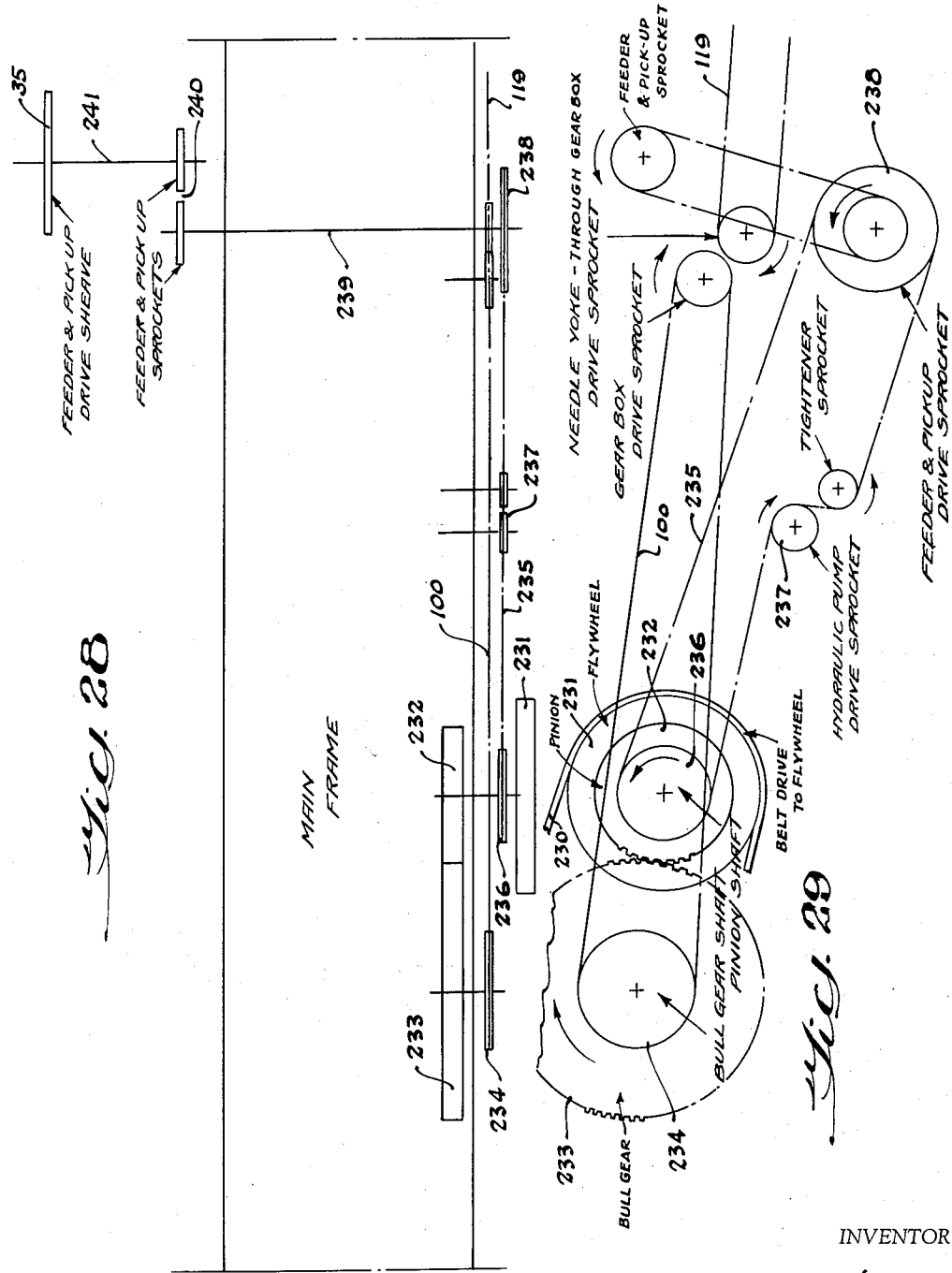

June 19, 1956 E. B. NOLT 2,750,877
AUTOMATIC PICK-UP BALERS
Filed Sept. 6, 1950 14 Sheets-Sheet 14
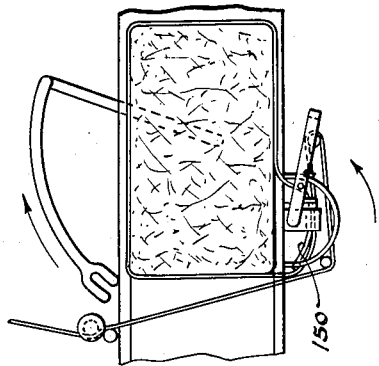
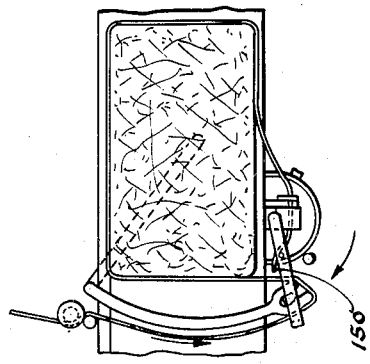
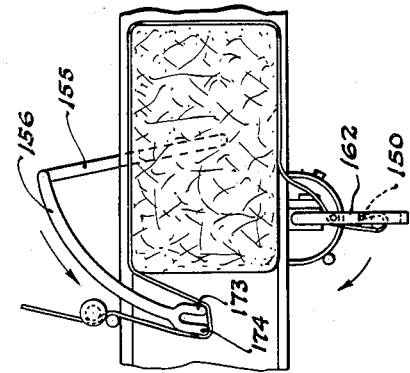
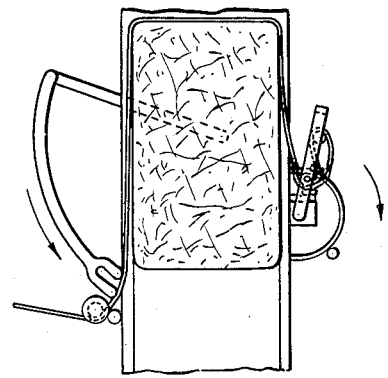
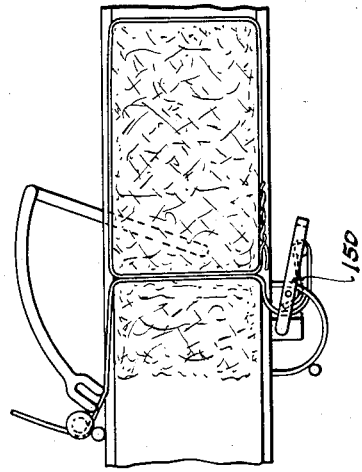
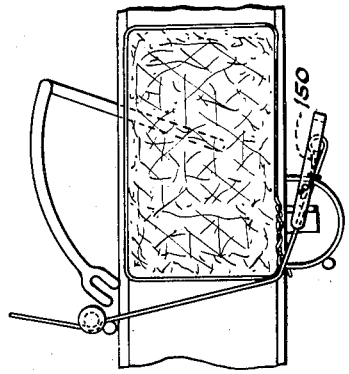
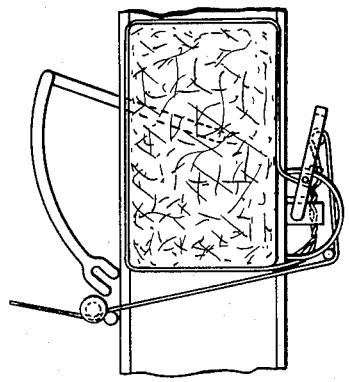
Inventor
Edwin B. Nolt
Allan R. Redrow
Attorney

United States Patent Office 2,750,877
Patented June 19, 1956

2,750,877

AUTOMATIC PICK-UP BALERS

Edwin B. Nolt, New Holland, Pa., assignor, by mesne assignments, to Sperry Rand Corporation, New Holland, Pa., a corporation of Delaware Application September 6, 1950, Serial No. 183,321

20 Claims. (Cl. 100—4)

This invention is concerned with an improved baler, and more particularly with a machine adapted to be moved through a field to automatically lift hay and the like from the stubble, compress it into a bale, and form and tie bands around the bales with either twine or wire.

The machine embodied in the present disclosure is an improvement on the type of automatic pick-up baler shown in the patent to Nolt No. 2,236,628, April 1, 1941, and includes a more positive acting hay pick-up means and feed means to deliver the cut and cured hay into the compression chamber of the baler. This invention also makes use of fully automatic means to initiate the tying cycle, to deliver wire or twine banding material from a source of supply, to wrap the bands around the bales, to tie the ends of the lengths of banding material together, and to sever the completed bands from the supply. In addition to these features, improved means are provided to produce a more uniform and constant pressure against the sides of the compressed hay moving through the baling chamber, and a new form of outfeed chute is shown for dropping the completed bales onto the ground with a rolling motion so that they come to rest in the field in a position out of the way of the baler making the next succeeding pass through the field.

The hay pick-up means for lifting the windrowed hay into the baler, is mounted on the right hand side of the machine, looking forwardly along the path of movement of the baler, and the pick-up is counterbalanced in such a manner as to nearly float along over the surface of the ground.

A driven conveyor is built into the pick-up which has spring fingers that pass forwardly through the stubble and under the windrowed hay to lift the windrow onto the bottom or floor of the chute structure of the floating pick-up. The windrow of hay is carried up the chute by the spring finger conveyor and is held in the chute by suitably weighted and freely suspended pressure rods which ride over the top of the up-feeding stream of hay.

As the hay reaches the top of the chute, an elongated rotating feed roller engages over the hay to press it gently but positively into contact with the flights of a rotating auger means positioned rearwardly of the feed roller. The hay is carried straight back by the conveyor and feed roll and then is turned to move in a direction at about right angles by the flights of the auger which deliver it to the end of the feed chamber.

When the hay reaches the end of the auger, it is fed forwardly past the auger into a space above a feed opening to the baling chamber and an improved wad board mechanism is driven downwardly into contact with the hay to force it into the compression chamber in front of the compression plunger. The wad board is retracted as the compression plunger moves forwardly to compact the hay against the material already driven into the compression chamber while another charge of hay is being fed forwardly into position under the wad board.

The plunger is driven forwardly a number of times to complete a bale and with each stroke of the plunger, a suitable knife means mounted on the plunger and bale case respectively, are operative to sever each charge of hay from the material being fed into the baler whereby to produce a separate slice, and as each stroke proceeds, each slice is individually compressed so that it may be separately removed from the bale when the bale is opened for use.

The compressed material is moved rearwardly as the new slices are formed, and a star wheel that engages against the side of the compressed material, is positively driven by its motion. With each revolution of the star wheel, a cam fixed to rotate with the star wheel trips a push rod assembly that is adapted to initiate operation of means for feeding the banding material and completing a tying cycle, while at the same time holding the plunger fixed at the outer end of its stroke so that the hay material fed into the bale chamber may be banded while it is held under compression.

After the tying cycle has been completed, the plunger is again connected to its drive mechanism and the slicing and compressing of the continuous flow of incoming hay material may proceed.

When one bale has been built up and banded, it is retained in the compression chamber to form a back wall against which the new material may be compressed. In order to provide a sufficient back pressure to effect a full compression of each slice in the bale being formed, the passage of the previously banded bale through the chamber is retarded by the frictional engagement of the bale with the walls of the chamber. The degree of frictional side wall pressure is controlled by selectively forcing portions of the side walls of the compression chamber inwardly, and in the present invention, an improved hydraulic arrangement is used to continuously produce a constant pressure on the sides of the bales.

The means for delivering the banding material around the bale and for completing the tying of the bands are all driven from a common source, the power being delivered through a gear box to accomplish the proper timing of all of the several elements which must coact together. This gear box includes a segment gear which is driven through one revolution to accomplish the desired sequence of operations and all of the power for driving the band feeding and tying means is transmitted from the gear box through suitable drive connections to the banding means.

In the preferred showing of the present invention, there is included a pair of cans for holding the wire supply and cooperating needles and wire gripping means to deliver two strands of wire around a bale. After the wire has been passed around the bale, the ends of the wires forming the bands are twisted together and the wires are then severed to separate the completed bands from the wire supply. The pair of needles are both carried on one side of the compression chamber and are adapted to be driven across the chamber through suitable slots provided in the face of the plunger to issue from the far side of the chamber carrying the wires. A cooperating gripper yoke means is then driven forwardly to engage the bight of the wire that has been delivered across the chamber by the needles. The gripper yoke is then returned to its starting position and while moving rearwardly along the bale chamber, lays the inner one of the strands of the bight of the wire in the wire twisting means to overlay the free end of the wire which was delivered into the twisting means as the gripper yoke moved forwardly to meet the needles.

As above stated, the needles and gripper yoke are all positively driven from the common gear box drive, and their motions are synchronized with the motions of the twisting and severing mechanism through the segment gear so that the twisting or tying operation is fully automatic. This entire train of motions in the wire feeding means and tying mechanism is set into operation when the push rod mechanism is tripped by the cam on a metering wheel, which push rod means in addition to initiating the stopping of the compressing plunger, also shifts a clutch means to connect the segment gear to its drive means.

The completed bales are pushed along in the chamber against the frictional contact of the walls of the chamber as the succeeding bales are being formed, and the finished bales are delivered out of the end of the compression chamber onto an outfeed chute that has a relatively thin ledge formed thereon to partially support the rearwardly extending end of each of the bales as they issue serially from the chamber while the front end of each such bale is held in the baling chamber. As soon as the bale is ejected in its entirety from the chamber, the bale slides rearwardly on the ledging for a few inches and then, since the ledge is not wide enough to support the bale, it rolls down over the side of the ledge onto a sloping surface. The sloping surface together with the ledge are about as wide as the bottom side of the bale and the sloping surface has a tripping flange at its lower side which engages the lower side edge of the bale as it falls onto the surface to give it a flip as it passes downwardly off of the sloping surface whereby to produce a rolling motion in the bale as it leaves the outlet chute. The bales then fall onto the ground as they are issued from the chamber and roll over a time or two to be displaced well to the left looking forwardly along the path through which the baler is moving. This rolling motion is produced in the bales so that they will roll away from the baler and as it makes its next pass through the field, the bales will be deposited in the field out of the way of the path of the baler so that the baler can freely move along the next windrow to pick up all of the hay without requiring movement of any of the previously formed bales before the second pass can be made.

All of these improved features are to be found in the machine described in this specification, a preferred form of which is shown in the following drawings, wherein:

Figure 1 is a front perspective of the preferred form of this invention;

Figure 2 is a top plan view of the machine shown in Figure 1, partly broken away;

Figure 3 is an enlarged top plan view of a portion of the push rod trip assembly;

Figure 4 is a side elevation of the wire tying side of the machine;

Figure 5 is a view taken on line 5—5 of Figure 2;

Figure 6 is a top plan view of the toggle mechanism actuated by the trip rod means for throwing the compression plunger latch and operating the segment gear clutch in the main gear box;

Figure 7 is a side elevation of the mechanism shown in Figure 6;

Figure 8 is a rear elevation of a separator device for holding the strands of the bight of the wire apart during a portion of the wire tying or twisting cycle;

Figure 9 is a top plan view of the mechanism shown in Figure 8;

Figure 10 is a top plan view of the gear box, partly broken away, for driving and timing the movement of the wire feeding, twisting, and severing mechanisms;

Figure 11 is a side elevation of the gear box shown in Figure 10, partly broken away;

Figure 12 is a detail assembly view partly broken away, showing the gear box segment gear clutch arrangement with the clutch disengaged;

Figure 13 is a view similar to Figure 12 showing the clutch in the piston occupied when the pawl of the clutch is engaged in a notch in the drive gear;

Figure 14 is a side elevation of the pick-up carried on the swinging gripper yoke for carrying the free end of the wire into a holding means on the twister and then picking up the bight of the wire supply from the needles to deliver the inner strand of the bight into the twister means;

Figure 15 is a rear end elevation of the wire pick-up shown in Figure 14;

Figure 16 is detail side assembly of the wire-tie or twister side of the machine;

Figure 17 is a detail perspective of the wire twister mechanism;

Figure 18 is a side elevation partly broken away showing the twister mechanism, the drive connections for projecting the twister, and the drive to the twister gears and wire severing device;

Figure 19 is a front elevation of the twister mechanism of Figure 18;

Figure 20 is a rear elevation of the twister mechanism showing the wire severing means;

Figure 21 is a view similar to that shown in Figure 20, with the cover to the twister housing removed;

Figure 22 is a detail view of a centering means for the twister mechanism, taken on line 22—22 of Figure 20;

Figure 23 is a view taken on line 23—23 of Figure 19;

Figure 24 is a perspective view, partly broken away, showing the hay pick-up and feed means;

Figure 25 is a detail perspective of an improved wad board feeder;

Figure 26 is a rear perspective of the machine showing the wire supply means;

Figure 27 is a detail perspective view of a wire supply safety switch to warn the operator when the wire supply gives out;

Figures 28 and 29 are diagrammatic views of the power drive system; and

Figures 30 to 36 are diagrammatic views of the wire feeding and tying cycle.

The machine forming the subject of this invention is shown in its preferred form as adapted to be towed behind a tractor, and includes means for tying two wire bands around the bales as they are formed in the compression chamber. Referring to Figure 1, it will be seen that the baler has a tongue 10 that may be connected to a drawbar of a tractor so that the baler trails behind the tractor to be moved through the field. The machine may be made fully automatic, and after the engine 11 has been started and the mechanism put in motion, the tractor operator need only pull the machine through the field so that the pick-up 12 follows down a windrow of the material to be baled to feed it into the machine.

*Pick-up and feed means*

The pick-up or feed means 12 is best shown in Figure 24, and it includes a pivotally supported, counterbalanced, chute member 13 which is carried on the baler so that the nose of the chute closely follows the contour of the ground. The chute is balanced so as to float over the ground and when unusual ground contours are encountered, the ground wheel 14 engages the surface to lift the chute up. The chute is provided with a floor made up of the spaced slats 15 which are positioned in spaced apart relation to provide slots through which the spring fingers 16 may move.

The fingers 16 form a continuously moving conveyor which combs the stubble in the field to work under the windrow to lift it onto the floor of the chute, and a plurality of the fingers 16 are carried on each of the several crossbars 17. The bars 17 are rotatably mounted at their opposite ends in bearings which are carried by the endless sprocket chains 19 mounted at each side of the chute, and the shafts 17 have extending ends which are connected to the cam followers 20 having ends 21 that are adapted to ride in the cam track 22 to control the position of the bars 17 and their associated spring fingers 16 so that the fingers are rotated forwardly under the nose of the chute and are held projected through the slots in the floor of the chute while the chains carry the rods 17 up the underside of the chute.

The endless chains 19 are mounted over suitable sprocket wheels, the uppermost sprocket wheels being driven to carry the rods 17 and teeth 16 in a direction to move hay up the floor of the chute. As the rods are carried through the under pass of the conveyor and as they reach the nose of the chute, the cam track is operative through the cam follower 20 on rod 17 to rotate the teeth 16 so that the spring teeth sweep forwardly under the chute to engage under the windrow of hay lying on the stubble and lift the hay onto the floor of the chute so that it can be moved upwardly across the floor thereof. As the teeth 16 and their associated rods 17 reach the upper end of the chute, the teeth 16 are retracted from their contact with the hay as the chains 19 pass around their upper support wheels. The cam track and cam followers cooperate with the motion of the chains to effect a vertical withdrawal of the fingers 16 through the slots in the floor of the chute.

Suitable weighted presser rods 23 are loosely mounted over the top of the chute floor in position so that the hay may be delivered into the chute and under the presser rods in order to prevent displacement of the hay on a windy day, and also to insure a positive contact between the hay and the teeth 16 to accomplish delivery of the hay up the chute.

As the hay reaches the top of the feed chute, a rotating feed roll 30 engages firmly over the top of the hay to positively feed the hay forwardly into the flights of a rotating auger feed 31 which turns the hay into a path through which it moves in a direction at right angles to its direction of movement up the chute. The auger delivers the hay forwardly and into position over the compression chamber. The feed roll 30 is rotated in the direction of the arrow, as shown in Figure 24, and at a speed to roll over the hay so that the blades of the feed roll press against the hay and simultaneously move it forwardly into the flights of the auger 31.

The feed roll 30 is mounted at the front and open side of the hood 32 that encloses the roll and auger mechanism, and the auger 31 is fully enclosed by the top, rear, and bottom walls of the hood 32 so that the hay is confined as it is delivered forwardly from the feed roll toward the compression chamber.

Suitable drive connections are provided to transmit motion to the spring finger conveyor, the feed roll 30, and the auger 31, and for this purpose, power is delivered from the motor 11 through suitable drive connections to the sheave 35, as shown in diagrammatic form in Figures 28 and 29. Sheave 35 drives V belt 36 which in turn transmits power to the sheaves 37 and 38. The sheave 37 drives sprocket wheel 39 which carries the sprocket chain 40 that drives sprocket wheel 41 connected to the drive shaft for the spring finger conveyor in the pick-up chute. Suitable idler and tightening sprockets are provided to insure a proper contact between the sprocket chain 40 and the driven sprockets 40 and 41. The sheave 38 drives the auger 31 which is mounted to be supported from one end only, and the sheave 38 also drives the sprocket wheel 42 that drives sprocket chain 43 and sprocket wheel 44 keyed to the bearing shaft of the feed roll 30.

The hay is delivered through the pick-up and feed means to the end of the auger 31 and into a housing 50, the open bottom of which is disposed over the feed opening 51 into the compression chamber. The housing 50 has an opening in its top side through which the wad board 52 is driven to reciprocate and the wad board presses the hay from housing 50 down into the compression chamber to place it in position in front of the compressing plunger which is driven to reciprocate in the chamber. The wad board reciprocates in timed relation with respect to the movement of the plunger, so that as the plunger retracts, the wad board moves downwardly to feed hay into the compression chamber and as the plunger starts forwardly, the wad board is quickly retracted so that the plunger may compress the new charge of hay against the previously compressed material held in the compression chamber.

The wad board is provided with a nose structure which is best shown in Figures 1 and 25. The tip 53 of the nose of the hollow wad board extends downwardly from the wad board drive, a distance to reach substantially across the compression chamber when the wad board is reciprocated downwardly to the lower end of its stroke. The wad board is also provided with a stepped-up heel section 54 which follows behind the tip 53 during its downward movement to pick up all of the hay fluffing up around the sides of the wad board in order to substantially separate the wad of infeeding hay from the continuous stream of hay being moved forwardly by the auger. The heel 54 is positioned with respect to the tip 53 such that at the lowermost end of the wad board stroke, the heel 54 will be somewhat within the confines of the compression chamber so that substantially all of a given wad of hay is quickly moved into position through the opening 51 to be situated before the plunger.

After the wad board has been retracted, the plunger is moved forwardly in the compression chamber and, referring to Figure 2, the knife 55 carried at the top edge of the edge of the face of the plunger moves against the stationary knife blade 56 fixedly mounted at the rear edge of opening 51 to the compression chamber to positively slice any threads of hay which might otherwise connect the batch of hay in the compression chamber with the hay feeding into the machine through the auger. It should be noted, however, that when the improved wad board of this invention is used, as above explained, most of the hay is positively stuffed into the compression chamber through the opening 51 by means of the tip 53 and the heel portion 54 of the wad board so that normally there is little cutting action to be performed by the cooperating knives 55 and 56.

*Bale or compression chamber*

After each wad of hay is delivered into the compression chamber, it is simultaneously compressed and fed forwardly under the pressure of the plunger. The usual spring fingers hold each of the slices in position while the plunger is moving through its return stroke and the wad is pushing a succeeding wad of hay into position.

When the bales have been completed and tied, additional wads of hay to form the next bale are pressed against the end of the finished bale one at a time and the tied bale is slowly pushed toward the exit of the bale chamber. As the tied bale is moved rearwardly, it is engaged by the side walls of the bale chamber which are free to flex inwardly under the influence of a hydraulically operated pressure creating means, see Figures 2, 4 and 5. In accordance with this teaching, the wall sections 60 and 61 are forced inwardly by a hydraulically driven piston mounted in the chamber 62, which is preferably fixed to the side wall section 61. A suitable yoke 63 is arranged to surround the bale chamber in a manner to transmit the power from the piston to the opposite wall section 60 so that any pressure produced on the piston in chamber 62 is effective to hold the wall sections 60 and 61 pressed inwardly against the walls of the bale with a constant pressure of a degree dependent on the pressure produced in cylinder 62.

The cylinder 62 is connected by a pressure line 64 with the hydraulic pump 65 so that a uniform and constant pressure may be produced in the chamber. The pump 65 is operative to create any desired static pressure in the oil line 64 so that by pre-setting the pressure produced by the pump, the degree of pressure of the wall sections 60 and 61 against bales pushing through the chamber can be controlled. The degree of the drag produced against the bales moving through the rearmost portion of the bale chamber determines the degree of compression that can be produced against each of the wads of hay fed into the baler.

As the bales are formed, the compressed hay is tied with two bands of wire, as shown in the preferred form of this invention, and suitable wire banding and tying or twisting means are associated with the baler mechanism to accomplish this banding operation. As the bands are completed, they are delivered from the tying mechanism and fall close against the walls of the completed bale through the slots 66 provided in the side walls of the bale chamber at the rear end thereof.

*Meter wheel and trip mechanism*

The wads of hay material or the like are fed into the bale chamber and pushed rearwardly by the plunger to be compressed against the previously completed bale, and all the while the hay is being compressed and fed rearwardly in the chamber, it is engaged by the rotatably mounted star wheel 70, see Figures 2 and 3. The star wheel may be selected to be of a desired size such that it will have been turned through one revolution when the desired length of hay bale has been formed. In the mechanism shown, the star wheel 70 is provided with an integral cam 71 which is carried around to engage a pin 72 fixed to a slidably mounted rod 73. The star wheel acts through the rod 73 to move the rod to the right as shown in Figure 16, so as to initiate a tripping action which through the use of a powered booster or push rod 74, causes the wire feeding and tying cycle to take place.

The rod 73 extends forwardly along the bale case past the star wheel and is connected through pin 75 with a spring latch 76 carried by rod 77 to pull rod 77 to the right, as shown in Figures 3, 16, and 17, when the tripping action takes place and with the assistance of power supplied from the reciprocating push rod 74. The motion of the rod 77 is transmitted through link 78 connected to bracket 77' on rod 77 (see Figures 6 and 7) to operate the toggle 79 and the motion of the toggle is operative to throw in the compression plunger stopping latch 80 that is pivotally mounted at its front end on the side of the bale case. The movement of the latch 80 is operative by means of pin 81 that cooperates with lever 82 through the lost motion slot 81' to move link 84 to the right in order to initiate the operation of the gear box drive and timing mechanism.

Since considerable force is required to throw the toggle spring 78', the above mentioned power booster or push rod 74 is provided, see Figure 16, the nose of which engages behind the forward end of lug 284 fixed on the rod 73 to assist in driving rod 73 to the right. The push rod 74 is mounted to have a reciprocating movement alongside the bale chamber and extends to the forward end of the twister side of the bale chamber where it is connected through the lever 86 with a suitable cam follower which is adapted to coact with the cam 87 driven from the main drive gear integral with the crank shaft from which the compression plunger is driven. The push rod 74 is continuously driven to have a reciprocating motion by the oscillating lever 86 and spring 88 which is adapted to pull the rod forwardly after the lever has passed over the high point of cam 87.

The lug 284 is normally disposed in position such that when rod 73 is in its untripped position, the downwardly turned nose 90 of the push rod 74 rides on top of the lug 284. When the cam 71 of the metering wheel, however, pushes the rod 73 to the right a short distance, see Figure 16, the nose 90 of the push rod 74 rides off of the forward end of lug 284 and drops down to engage behind it to push rod 73 to the right with sufficient power to trip the toggle mechanism and start the operation of the tying cycle.

Upon completion of the tying cycle, a cam 91 fixed to the drive shaft of the needle yoke forming part of the tying mechanism, engages a pin 76a, seen in Figure 3 on the latch 76 to uncouple the push rod 73 from push rod 77 and drive rod 77 forwardly to return the toggle mechanism 79 to its starting position, as shown in Figure 6. The motion of toggle plate 79 withdraws the plunger latch 80 from behind the plunger so that the plunger can be again connected to the drive system to continue the compressing operations. When movement of the hay through the chamber is again established, the star wheel is driven to rotate and the cam 71 is then driven past the pin 72. When the cam releases the pin, the push rod 73 is retracted to the left, see Figure 3, to its initial starting position by a suitable spring and the rod 73 is engaged behind the catch 75 to reset the trip mechanism for its next cycle. The nose 90 of push rod 74 is lifted on each return stroke of the push rod to pass up onto the top of the lug 284 when it returns to its starting position to complete the resetting. To this end, the downwardly turned nose 90 of the push rod, when fully retracted, rides up onto the floor 90a of a slide bearing 90b (Figure 16) to raise the nose 90. At this time retraction of the rod 73 brings the abutment 84 into closely adjacent relationship with the bearing 90b, so that the upper surface of the abutment 84 which is on the same level with the floor 90a, in effect constitutes a continuation of the adjacent slide bearing floor 90a, whereby the nose 90 of push rod 74 will be caused to reciprocate over the floor 90a and the top of adjoining abutment 84 until such time as the action of the bale metering wheel moves the rod 74 and abutment 84 to the right in Figures 3 and 16 sufficiently for the nose 90 to drop into the gap between the slide bearing 90b and abutment 94 to operatively engage the abutment.

*Gear box*

The gear box drive means, for timing the sequence of operations of the mechanism adapted to perform the tying cycle, is mounted on the side of the bale compression chamber, and referring to Figures 4 and 10, it will be seen that the gear box receives power from sprocket wheel 99 integral with the crank shaft that drives the compressing plunger, the power being delivered to the gear box through sprocket chain 100 to drive shaft 101 that has pinion gear 102 keyed thereto. The pinion 102 meshes with the drive gear 103 which is constantly rotated within the gear box to provide power for operating the elements of the tying mechanism through suitable drive connections that become energized when the tying cycle is to be performed.

As above described, after a bale has been completed and is to be banded, the lever 83 is tripped by the push rod mechanism and toggle drive, and then the segment gear 104 is connected to the driving gear 103 by means of the pawl clutch arrangement which is best shown in Figures 11, 12, and 13. Referring to Figure 11, the lever 83 is connected to shaft 105 which has a lever 106 at its inner end, the lever 106 being provided with an offset nose portion 107 which is adapted, before the tripping action is initiated, to engage behind the surface 108 forming a portion of the leading edge of the cap portion of the pawl clutch. As long as the nose 107 is engaged behind the surface 108, the pawl clutch is held in the position shown in Figure 12, so that the driving gear 103 passes by the pawl at the lower end of the clutch and the segment gear remains at rest. When the lever 83 is shifted to the right, Figure 11, as the toggle mechanism is tripped, the nose 107 is raised and the spring 109 flips the cap of the pawl clutch to the position shown in Figure 13. The energy supplied by the spring partially rotates the pawl clutch element to cause the half round section 110 at the lower end of the pawl to move into position to be engaged by the wall section of one of the recesses 111 formed in a recess in the hub portion of the driving gear 103. When the half round section 110 is engaged in a recess 111, the segment gear is carried around with the driving gear and several pinion drive means positioned in the gear box are engaged by the teeth of the segment gear to drive the various elements of the tying mechanism to complete the tying cycle.

At the start of its cycle, the segment gear is in the position shown in Figure 11 with pinion gear 112 in contact with the center portion of the gear track of the segment gear. When the segment gear begins to rotate, the pinion 112 is driven to turn the shaft 113 through one half a revolution, and shaft 113 in turn drives the miter gears 114 and 115 to drive the shaft 116 that is connected at its rear end with a means to project the wire twisting means into position to receive the ends of the wires which are to be twisted to form the bands around the bale.

Also immediately at the start of the gear box cycle of operations, the segment gear engages the pinion 117 to drive the shaft 118 having a sprocket wheel keyed to its outer end that drives sprocket chain 119. Sprocket chain 119 constitutes the drive to a common drive shaft for operating the needle means that complete the feeding of the wires around the bale and for operating the wire gripper yoke which holds the free ends of the wires and cooperates with the needles to deliver the wires to the twisting means as will appear more fully below.

It is thus seen that because the segment gear forms a common drive for the wire twister projecting means, and the needle and the wire gripper means, that all of these elements move in timed relation to project the wire twister in time to receive the wire. As soon as pinion 112 has been turned through one half a revolution and the wire twister is projected to its outermost limit, the holding arc 120 integral with pinion 112, is engaged over the circular portion 121 of the segment gear to hold the pinion 112 against rotation to thereby fix the twister in its projected position until the surface 121 is rotated to move out from under arc 120. The arc and circular portion are proportioned to be held in engagement while the twisting of the wires is completed and the bands are severed from the wire supply. Similarly, after the segment gear completes its driving of the pinion 117 through one revolution so that the needles and wire gripper yoke have completed their motions, the arc 122 integral with pinion 117 engages the surface 121 to hold pinion 117 fixed during the remainder of the revolution of the segment gear.

While the segment gear is moving through the first portion of a single revolution, it drives the pinions 112 and 117 as described above, and during this portion of the rotation of the segment gear, the arc 139 of a pinion 140 rides surface 121 of the segment gear. Immediately after pinion 117 has been driven through one revolution arc 139 rides off surface 121 and the segment gear meshes with pinion 140 to drive it through one revolution. The pinion 140 is keyed to the shaft 141 which drives the miter gears 142 and 143 to transmit motion through shaft 144 and suitable universal joints to drive the slotted wire twisting gears and the severing means. After driving the pinion gear 140 for one full revolution, arc 139 again passes onto surface 121 and the teeth of the segment gear are again driven into contact with pinion 112. At this time, arc 120 has been freed from its contact with surface 121 so that the pinion 112 may be rotated for another one half revolution as the segment gear completes its one revolution to return to the position shown in Figure 11. During this half of the revolution of pinion 112, the wire twister mechanism is retracted so that the completed bands are stripped from the twisting mechanism by suitable stripper cams in order that they may be laid against the sides of the completed bale.

The several elements of the wire feeding and twisting means are thus timed to have a proper sequence of operations and receive their driving power through one revolution of segment gear 104. It will be noted too that at a proper time in the tying cycle, the cam 87 on the common drive shaft for the needle yoke and wire gripper yoke resets the trip mechanism for the next succeeding bale tying operation and when rod 77 of the trip mechanism is unlatched from rod 73 by cam 91 and is driven to the left as in Figure 3, the toggle 79 is reset. The return movement of toggle 79 by means of cam 91, retracts the plunger latch 80 and resets lever 83 to bring nose 107 down into position to catch surface 108 on the cap of pawl clutch as it comes around the top of the path of revolution of the segment gear. When surface 108 is engaged by nose 107, the pawl 110 is rotated out of contact with its cooperating recess 111 and the drive connection from gear 103 to the segment gear is released. If for any reason, the cam 91 should fail to reset the trip rod mechanism, a cam 145 is provided on the inside of the rim of the segment gear, the cam being adapted to engage nose 107 if it has not been properly reset, to move it downwardly into position to catch surface 108 to positively stop the twister drives after one revolution of the segment gear.

Wire twister and feed

The twister mechanism is best shown in Figures 16 through 23, and motion is transmitted to the twister as explained, from the gear box through the rotating shafts 116 and 144, and the sprocket chain 119 which drives the wire feeding means.

After a bale has been completed, the elements of the twister mechanism occupy the position shown in Figure 16, and the wire is threaded through the machine as shown in the diagrammatical view, Figure 35. At this point in the banding cycle, the completed band has been severed from the wire supply and the free end 150 of the wire is threaded around means carried at spaced points on the wire gripper yoke. When baling operations are resumed, the free end of the wire is firmly held in the slotted means 146 fixedly carried on the wire guide 170 as shown in Figures 17 and 36, and as the hay is being compressed against the previously formed bale, wire is drawn from the wire supply cans 151, Figure 26, carried on the back end of the hay pick-up and feed structure. The wire is looped around the carrying means on the gripper yoke and is pulled in the slotted means 146 on top of the free end of the wire to hold the free end as hay is fed into the machine, see Figure 36, and the hay is pressed in by the plunger until a bale is completed at which time the wire occupies the position shown in Figure 30. It will be noted that during the formation of the bale, the horn shaped wire guide 147, see Figures 14 and 17, is positioned between the two strands forming the wire loop at the free end. When the completed bale stage is reached, the metering wheel 70 will have completed one revolution and the trip rod mechanism is engaged by the cam 71 so that the toggle 79 is tripped to initiate a tying cycle. The power from the gear box is then transmitted through sprocket chain 119 to rotate the gripper yoke and needle yoke drive shaft 152 for one revolution, the shaft 152 being connected through suitable links to drive the wire feeding needles and wire gripper yoke for accomplishing the delivery of the wires from the supply cans 151 across the bale chamber, and placement of the wires in the twister, as shown in Figures 31 and 33. Thereafter, the twisting and severing operations are completed as shown in Figures 34 and 35.

The linkage mechanism for driving the gripper yoke and the needle yoke is best shown in Figures 2, 5, and 16, wherein the drive shaft is shown as having a pair of crank arms 153 fixed to its top and bottom ends, the crank arms each being connected through a link 154 with the oscillating needle yoke 155, as best shown in Figure 2. The needle yoke is designed to carry a pair of arcuate shaped needles 156 that may be driven across the chamber to carry the wire across bale chamber, which needles, see Figures 26 and 30 to 36, are provided with bifurcated ends to engage and feed the wire across the bale chamber in a manner to provide an open bight that can be easily passed to the holding means on the gripper yoke.

The gripper yoke drive connection with shaft 152 is through the eccentric 160 and link 161 connected between the gripper yoke and a collar 160a journalled on said eccentric, the gripper yoke being driven to oscillate along the wire twister side of the bale case. The wire gripper yoke carries the wire holding means 163 at spaced points along one side of the yoke member, the wire holding structures being shown in detail in Figures 14 and 15.

The wire gripper yoke is oscillated forwardly along the side of the bale chamber, referring to Figures 14, 17, and 31, and the loop at the free end of the wire engaged in the holding means 163 is carried forwardly so that the wire slides through guide slots in each of the top and the bottom wire guides 170, see Figures 16 and 17. During this movement, the free ends of the two wires are first carried up over the horn shaped wire guides 170 and as the gripper yoke continues in its movement the wires are pulled out from between the wire guides 170 and the holding means 163 and are directed into position in the wire twisting means while the wire twister is being projected. When the wire gripper yoke reaches approximately the forward end of its oscillating stroke, and while the free end is still trapped between horn 147 and holding means 163, the free ends of each of the wires are forcibly delivered under the springs 171, see Figure 17, so that the springs engage the free ends of the wire against the saw tooth members 172. At about the forward end of the gripper yoke movement, and after the free ends of the wires have been laid in the saw tooth holding means, the gripper yoke passes to the position shown in Figure 32 so that the holding means 163 passes between the tip ends 173 and 174 of the bifurcated end of each of the needle means so that the bight formed in each of the wires being delivered across the bale chamber by the needles, slips upwardly on the sloping surface 175 of the wire holding means, see Figure 14. The bight of the wire passes over the tip of the surface 175 and then as the motion of the wire gripper yoke is reversed so that it moves in the direction shown in Figure 33, the bight of the wire passes downwardly past the end of latch 176 to be positioned around the wheel 177 which draws out the wire from the supply 151 as the gripper yoke is driven rearwardly along the side of the bale chamber.

As the gripper yoke draws the wires out, the innermost strand of the bight formed in each wire is directed by the wire guide 170 and the hook shaped guides 178 fixed to the twister housing to be laid over the free end of the wire already laid in the twister mechanism, and when the gripper yoke reaches the end of its return stroke, the twister gears are energized to twist the free end of each of the wires and each of the overlaid strands together. When the twisting action is completed, the wires are severed from their supply so that the completed bands can be released from the wire twister mechanism and the next baling cycle proceeds.

To assist in properly laying the wire in the twister mechanism, the two strands forming the bight of the wire are held separated by separator pins which are projected between the two strands forming the bight as the wire gripper yoke moves from the position shown in Figure 32 to the position indicated in Figure 33. The wire separator means is best shown in Figures 8, 9, and 17, wherein it is seen that the separator body 180 is supported between the two wire guides 170, the body having bearings therein for reciprocally carrying the pins 181 which are adapted to be projected from the top and bottom of the body to be positioned between the strands of the wire as indicated diagrammatically in Figures 33 and 34. The pins 181 are connected by links 182 to the rotatably mounted plate 183, the links being eccentrically carried with respect to the axis of bearing 184 about which the plate rotates. The plate 183 is normally biased to rotate in a clockwise direction, referring to Figure 8, whereby to cause the pins 181 to be driven outwardly from the body to be projected between the strands forming each of the bights in the wires. The plate 183 is normally held latched in the position shown in Figure 8 so that the arms 181 are held retracted and as the gripper yoke oscillates about the wire twisting mechanism, the trip arm 185 comes into contact with the spring projected nose piece 186 carried pivotally on latch 187.

When the gripper yoke swings forwardly, the trip arm 185 passes the nose piece, the nose piece swinging about its pivot and permitting the arm 185 to pass by. On the return stroke, the arm 185 catches the trip of the nose piece and carries the latch with it to release plate 183 for rotation so that the pins 181 are projected. Just as soon as the gripper yoke has passed the nose piece, the latch 187 is released and is biased to return to its latching position, and when the plate 183 is returned to its initial position against the tension spring, the latch 187 snaps into position to hold the pins retracted until the next cycle is started. Plate 183 is returned to its original position by a cocking bracket 188', see Figure 19, carried on the twister housing, and when the twister retracts, the cocking bracket engages the lug 188 which is carried integral with plate 183 to rotate the plate in a counterclockwise direction, see Figure 8.

The means for twisting the overlaid strands of the wires together is best shown in Figures 17 through 23. As shown in Figure 17, the twister housing 190 is mounted for sliding movement in the slide bearing supports 191 which are carried from the side of the bale chamber. The twister housing 190 is provided with slide bearings 192 which cooperate with suitable slide tracks in the supports 191 so that the twister housing can be projected in timed relation with respect to the movement of the needles and the gripper yoke so as to receive the strands of the wires which are to be twisted together.

Referring to Figure 21, free ends of the two wires are laid in the slot 193 in the top and bottom twister gears 194 as the gripper yoke moves forwardly along the bale case, and at this point it should be noted that as the free ends of the wires are drawn out from around wheel 177 as the gripper yoke moves forwardly, the wire is bent in such a manner that it tends to bow inwardly toward the bale case whereby to assure its seating against the bottom of the slot 193 of the twister gear. When the gripper yoke makes its return trip, the inner strands of the bights of the wires are laid over each of the free ends positioned in each of the twister gears, the two wires in each gear being thus laid in parallel relationship with respect to each other. The wires are confined in the relatively narrow slots 193 and as thus disposed in the twister gears are ready to be joined together. The segment gear in the gear box drive then engages pinion 140 to drive the shaft 144 which is connected to the main drive gear 195 in the twister housing and the gear 195 causes the two wire twister gears 194 to rotate as is clearly shown in Figure 21, to cause the wires to be twisted by several revolutions of twister gears 194, but preferably they are twisted four times as the gear 195 makes one revolution. While the wire twists are being completed, the plunger knives 196 are projected across the anvils 197 formed on the rearmost hook guides 178 to sever the twisted wires from the wire supply means. This then leaves the free ends of the two wires engaged around the wire holding means 163 carried on the gripper yoke and trapped in the slotted holding means 146 fixed to the wire guide 170.

The wire severing knives 196 are projected by means of a cam 198 fixedly mounted on the rear end of the driven shaft 144, the cam 198 cooperating with cam follower 199 that is mounted to rotate about the axis of shaft 200, the cam follower having links (not shown) eccentrically connected thereto to drive the knives 196 outwardly to sever the two strands of wire. As soon as the shaft 144 has completed one revolution, a suitable spring means 244 is operative to rotate the cam follower 199 in a counterclockwise direction, referring to Figure 20, to return the knives to their retracted position.

The twister housing is projected and retracted on bearing 192 during the twisting cycle by the rotation of shaft 116 which carries a crank arm 201 at its rear end which is connected to a link 202 which drives the housing outwardly and then the drive to shaft 116 goes through a dwell before retracting the twister housing.

The power drive for rotating shaft 116 to produce the desired one half revolution, dwell, and then one half revolution, has been described above. Referring to the view shown in Figure 19, the shaft 116 has been rotated through 180 degrees to project the twister housing and the twister gears are ready to receive the two strands of each of the wires as the gripper yoke is swung forwardly and back during the tying cycle. After the twists have been completed and the wires severed from the supply, the shaft 116 is again driven through another 180 degrees to retract the twister housing in the slide bearing 191. The twister housing is retracted toward the left from the position shown in Figure 19. As the twister housing is retracting, suitable fixed cam or stripper means 203, see Figures 18 and 19, carried integral with the slide bearings 191 engage twisted wires and strip them from the twisting gears 194. The cam means are positioned adjacent each side of the top and bottom twister gears with wire engaging portions in alignment with the slots 193 in the twister gears. The cams guide the twisted portions of the wires so that they pass over and under the stripper cams, respectively, to fall against the sides of the bale.

It is essential to center the relatively narrow wire receiving slots 193 after each tying cycle, so that they will be in proper position to receive the wires to be fed in on the next tying cycle, and for this purpose, the fork 210 which is fixed on the drive shaft 144, passes over the roller bearing 211 which is fixed to the frame of the machine. These fork and bearing members cooperate to center the drive gear 195 fairly closely in order that the slots 193 in the twister gears 194 will be accurately aligned with the slots in the wire guide, and after the drive gear 195 has been generally centered in this manner, the spring pressed ball 212 snaps into the centering hole 213 formed in the side wall of the gear 195 to very accurately center gear 195 to align the slots 193 so that the wires can be easily passed into the twister gears 194.

*Wire supply*

The wire supply means includes a pair of cans 151 that are adapted to each hold a coil of wire, see Figure 26, and the wire is passed from the cans to the wire guides 212 that include wheels 213 about which the wires pass so that they may be easily drawn out as hay is compressed in the chamber, as shown in Figures 35 and 36, the wheels 213 also serving to hold the wire accurately positioned in front of the bifurcated ends of the needles so that they can pick up the wires to push the bight across the bale chamber as shown in Figures 30 to 32. The free end of each of the wires is held in the wire holding means carried by the gripper yoke and the free ends remain stationary while the wires are drawn out from the cans 151 as each of the bales is built up. The wire feeding and tying may proceed automatically until the wire supply is about exhausted.

When the wire in either can is about used up, the warning device shown in Figure 27 is operative to give the operator a signal so that the supply may be replenished.

The warning means here shown takes the form of an electrical switch that may be connected into a circuit to sound a buzzer, but which preferably is connected into the spark system of the motor on the baler to cause the motor to misfire or stop as the operator prefers. The switches are preferably carried on each of the wire guides 214 respectively fixed adjacent the outfeed from each of the cans 151. The wire is passed through each of the switches in a manner to hold the spring arm 215 raised and as long as the wires flow through the switches, the circuit through each of the switches is held open, however, if the wire supply from either can gives out, the spring arm associated with the switch on that particular can is released to close a circuit through contact 216. A buzzer may be energized or the motor grounded out to warn the operator of the baler of the fact that the wire supply is low.

During normal operation of the baler, it is important that the wire supply means operates as smoothly as possible, and a needle yoke brake 217 is fixed to the bale case to dampen vibrations which might be present in the needle yoke. The brake has an open end to resiliently receive the yoke between its walls, and the insides of each of the walls is lined with a friction material. As the needle yoke begins its stroke, it must be driven out from the frictional grip of the brake and thus all lost motion and vibration due to the drive mechanism connections are eliminated so that the needles may move smoothly against the wires to initiate the feed thereof across the bale chamber.

*Outfeed chute*

The bales are completed when the wire bands are placed around the bales, and the feeding action is then continued to compress the batches of hay that are being newly fed into the chamber. The new hay is pressed against the face of the previously formed bale, the movement of which is retarded through the bale chamber by the wall sections 60 and 61 that are driven inwardly by the hydraulic piston 62 so that the new slices of hay are properly compressed, while at the same time, the formed bale is pushed rearwardly through the bale chamber.

As the completed bale issues step by step out the end of the chamber, it is supported at its rear end on the ledge 220 of the outfeed chute. Referring to Figures 2 and 4, the outfeed chute is best seen, and in Figure 2, the chute is shown lifted up against the outfeed end of the bale chamber for transportation to and from the field. When the baler is in operation, the outfeed chute is lowered to the position shown in Figures 4 and 26, so that ledge 220 forms in effect a continuation of the floor of the compression chamber.

The compressed bales are supported by the engagement of their front ends in the bale chamber and their rear ends move along ledge 220 during the time when the bale is being forced out of the chamber by successive strokes of the compressing plunger. After the bale has been pushed entirely out of the bale chamber, it is supported for a moment on the ledge 220, which has a width somewhat less than the width of the bottom side of a bale, so that the bale tends to fall down onto the sloping surface 221 formed integral with the outfeed chute. As the bale balances over the shoulder between ledge 220 and the surface 221, a rolling action is produced so that when the bale hits the tripping flange 222 located at the bottom of the surface 221, the bale is flipped over so that it will turn over several times upon rolling out on the ground.

The production of this rolling action in the bale feeding out of the baler is of particular advantage in that when the bale is thus dropped onto the ground, it rolls laterally away from the baler so as to be well out of the path through which the baler moves in making the next pass around the field. In using an outfeed chute as here shown, it is quite practical to follow the spiral or other closely spaced windrows produced in the usual hay field and drop the bales in the field without first picking up the bales made during the preceding pass of the machine around the field or requiring that they be moved out of the path of the baler.

*Drive system*

A diagrammatic showing of the drive to the various elements of the machine is shown in Figures 28 and 29.

Referring first to Figure 1, the motor 11 is connected by a belt 230 to flywheel 231 which is connected by a pinion gear 232 to bull gear 233 that is integral with the crank shaft for driving the compressing plunger.

A sprocket wheel 99, see Figure 4, is mounted integral with the bull gear to drive sprocket chain 100, which transmits power to the gear box timing and drive means.

The gear box, as previously described, through the segment gear drives the sprocket chain 119 to effect operation of the gripper yoke and needle yoke in timed sequence to the movement of the twister mechanism.

The flywheel 231 has a sprocket chain 235 driven from sprocket wheel 236 integral therewith, the sprocket chain 235 being trained over the sprocket wheel 237 that drives the hydraulic pump to create a pressure for controlling the bale tension means 62. The sprocket chain 235 is also trained over sprocket wheel 238 which drives the shaft 239 that transmits power to the sprocket chain 240 that in turn drives shaft 241 providing power for the sheave 35 that drives the pick-up mechanism. Sheave 35 is connected to the driven elements of the pick-up mechanism as previously described in connection with the pick-up shown in Figure 24.

*Operation*

The baler forming the subject of this invention is adapted to be towed behind a tractor and moved through a field to pick up hay which has been previously raked into a windrow. The pick-up means 12 is driven down the windrow to lift the windrow into the feed chute and the spring fingers 16 are operative to carry the hay upwardly so that it passes under the feed roll 30 which delivers it into the auger 31. The auger is continuously rotated to deliver the material into position over the bale chamber, and the wad board 52 is reciprocated to press the hay into the compression chamber in front of the compression plunger.

The plunger is reciprocated to compress each batch of hay delivered into the compression chamber and includes a knife means to simultaneously cut any strands of hay passing between the wad of hay delivered into the chamber and the hay still in the auger feed means. As the slices are compressed, the hay is pushed deeper into the bale chamber, and as it is moved into the chamber, the measuring wheel 70 is rotated. After the measuring wheel 70 makes one revolution, it trips the powered push rod trip mechanism, including rods 73 and 77 to throw the toggle 79 that is adapted to project the plunger stopping latch 80 and initiate the wire banding and twisting operation. The compressing plunger is held stationary while the wire feeding and twisting operations are completed and the gripper yoke 162 and the needle yoke 155 are driven in timed sequence to the operation of the wire twister mechanism shown in Figures 18 to 21 to cause the free ends of the wires to be laid in parallel relationship with the inner strands of the bights of the two wires being fed across the bale chamber so that these overlaid wires may be twisted together to form a tie. The knives 196 of the twister mechanism are then driven past anvils 197 to sever the completed bands from the wire supply means while leaving the newly formed free ends of the wires held firmly in the two spaced gripper yoke holding means 163.

The twister mechanism and the wire handling means are all driven in timed sequence from a single gear box wherein the segment gear 104 is driven through one revolution to engage in proper sequence the pinion gears 112, 117, and 140 to accomplish the proper driving of the various elements of the twisting mechanism.

After the bale has been completed, it is held in the compression chamber to provide a back pressure against which the infeeding hay may be pressed to produce the next succeeding bale. The fully formed bale is not ejected from the compression chamber until the new bale has been formed and banded, and thereafter the first bale is pushed out onto the outfeed chute which acts upon the bale to cause it to roll over as the bale falls from the ledge 220 onto the sloping surface 221, the rolling action being continued as the bale trips from the flange 222 and falls onto the ground whereby to roll the bale laterally away from the path being followed by the baler.

The description given above covers the preferred form of this invention. It is apparent that many of the features of this device may be adapted to other forms of baler, including pick-up balers adapted to tie twine around the completed bales. It is, therefore, intended that this description be considered merely as one example of the best way of performing this invention, and it is contemplated that many modifications thereof may occur to those skilled in the art, which will fall within the scope of the following claims.

I claim:

1. In a pick-up baler having means to compress hay, straw, and the like, into a bale form, and including means to band the formed hay with at least one strand of wire by twisting the ends of the wire strand together to complete the band, the improvement comprising a housing for carrying said twisting means, slide bearing means for supporting said housing, stripper means carried by said slide bearing means in position to project within a completed band, and means to relatively project said twister housing beyond said stripper means while the twisting operation is being completed and then to retract said housing past said stripper upon completion of a twisting cycle to effect removal of the completed wire band from the twisting means.

2. In a pick-up baler having means to compress hay, straw, and the like, into a bale form, and including means to band the formed hay with at least one strand of wire by twisting the ends of the wire strand together to complete the band, the improvement comprising a housing for carrying said twisting means, slide bearing means for supporting said housing, a relatively fixed stripper means carried by said slide bearing means in position to project within a completed band, and means to project said twister housing beyond said stripper means while the twisting operation is being completed and then to retract said housing past said stripper upon completion of a twisting cycle to effect removal of the completed wire band from the twisting means.

3. In a pick-up baler having means to compress hay, straw, and the like, into a bale form, and including means to band the formed hay with two strands of wire by twisting the ends of each of the wire strands together to complete the bands, the improvement comprising a housing for carrying said twisting means, slide bearing means for supporting said housing, relatively fixed stripper means for cooperating with said twisting means, said stripper means being located at the side of the housing and having tapered nose means adapted to project between said bands, and means to project said twister housing beyond said stripper while the twisting operation is being completed and then to retract said housing past said stripper upon completion of a twisting cycle to effect removal of the completed wire bands from the twisting means in a manner so that the bands pass beyond opposite ends of the housing after they are stripped from the twisting means.

4. In a pick-up baler having means to compress hay, straw, and the like, into a bale form, and including, means to band the formed hay with at least one strand of wire by twisting the ends of the wire strand together to complete the band, the improvement comprising a housing for carrying said twisting means, said twisting means including a slotted gear to receive each strand, slide bearing means for supporting said housing, a relatively fixed stripper means for cooperating with said twisting means, a rotating drive connection carried through a bearing fixed to said housing to rotate the slotted gear, means to project said twister housing beyond said stripper while the twisting operation is being completed and then to retract said housing past said stripper upon completion of the twisting cycle to effect removal of the completed wire band from the twisting means, and centering means associated with said rotating drive to return said slotted gear to its initial position as the housing is being retracted.

5. In a pick-up baler having means to compress hay, straw, and the like, into a bale form, and including means to band the formed hay with at least one strand of wire by twisting the ends of wire strand together to complete the band, the improvement comprising a housing for carrying said twisting means, said twisting means including a slotted gear to receive each strand, slide bearing means for supporting said housing, a relatively fixed stripper means for cooperating with said twisting means, a rotating drive connection carried through a bearing fixed to said housing to rotate the slotted gear, means to project said twister housing beyond said stripper while the twisting operation is being completed and then to retract said housing past said stripper upon completion of the twisting cycle to effect removal of the completed wire band from the twisting means, centering means associated with said rotating drive to return said slotted gear approximately to its initial position as the housing is retracted, and a second centering means in the housing for spotting the slotted gear exactly in its initial position.

6. In a pick-up baler having means to compress hay, straw, and the like, into a bale form, and including means to band the formed hay with at least one strand of wire by twisting the ends of the wire strand together to complete the band while simultaneously effecting the severing of the band from the wire supply, the improvement comprising a housing for carrying said twisting means, slide bearing means for supporting said housing, a stripper means for cooperating with said twisting means, a rotating drive connection carried through a bearing fixed to said housing for driving said twisting means, said rotating drive including a cam for actuating a severing means for separating the band from the supply as the twisting operation proceeds, and means to project said twister housing beyond said stripper relatively while the twisting operation is being completed and then to retract said housing past said stripper upon completion of the twisting cycle to effect removal of the completed wire band from the twisting means.

7. A baler including cooperating wire gripping and needle means operative from opposite sides of a compressing chamber for hay or the like to assist in the forming of a wire band around the bale, and means to receive the ends of the strand of wire to be formed into the band by joining them together, and then severing the completed band from the wire supply to complete a bale formation and banding cycle; comprising a unitary drive system for timing the motion and driving said band forming means; said drive system having a driven segment gear; means to drive said segment gear through one revolution only during each banding cycle; and a series of pinion gears spaced around the path of the travel of the segment gear for driving engagement by said segment gear; and drive connection means interposed between the respective pinion gears and said wire joining means, wire gripping means, needle means, and severing means, whereby to drive the elements of said band forming mechanism in timed sequence when said segment gear is rotated.

8. A baler including cooperating wire gripping and needle means operative from opposite sides of a compressing chamber for hay or the like to assist in the forming of a wire band around the bale, and means to receive the ends of the strand of wire to be formed into the band by joining them together, and then severing the completed band from the wire supply to complete the bale formation and banding cycle; comprising a unitary drive system for timing the motion and driving said band forming means; said drive system having a constantly running drive gear; a driven segment gear; a clutch positioned between said drive gear and said segment gear; means to effect engagement of said clutch to drive said segment gear through one revolution only during each banding cycle; and a series of pinion gears spaced around the path of the travel of the segment gear for driving engagement by said segment gear; and drive connection means interposed between the respective pinion gears and said wire joining means, wire gripping means, needle means, and severing means, whereby to drive the elements of said band forming mechanism in timed sequence when said segment gear is rotated.

9. A baler including cooperating wire gripping and needle means operative from opposite sides of a compressing chamber for hay or the like to assist in the forming of a wire band around the bale, and twisting means carried in a housing adapted to be projected beyond cooperating stripping means to receive the ends of the strand of wire to be formed into the band by joining them together, and then severing the completed band from the wire supply to complete the bale formation and banding cycle, whereupon the housing is then retracted within the strippers, comprising a unitary device system for timing the motion and driving said band forming means; said drive system having a driven segment gear provided with a smooth arcuate periphery throughout the non-toothed portion of the gear; means to drive said segment gear through one revolution only during each banding cycle; and a series of pinion gears spaced around the path of the travel of the periphery of the segment gear for driving engagement by said segment gear; certain of said gears having holding arcs integral therewith adapted to ride on the arcuate periphery of said segment gear to positively hold said respective pinion gears stationary during a portion of the banding cycle; and drive connection means interposed between the respective pinion gears and said wire joining means, wire gripping means, needle means, and severing means, said segment gear being initially in contact with the pinion gears for driving said housing to project it and for carrying the wire around the bale, the segment gear then being driven into engagement with the twister drive pinion and re-engaging the housing drive pinion to retract the housing into the stripper; said segment gear and the pinions with their integral holding arcs being operative to drive the elements of said band forming mechanism in timed sequence when said segment gear is rotated.

10. A baler including cooperating wire gripping and needle means operative from opposite sides of a compressing chamber for hay or the like to assist in the forming of a wire band around the bale, and means to receive the ends of the strand of wire to be formed into the band by joining them together, and then severing the completed band from the wire supply to complete the bale formation and banding cycle; comprising a unitary drive system for timing the motion and driving said band forming means; said drive system having a driven segment gear; means to drive said segment gear through one revolution only during each banding cycle, including a clutch on the segment gear movable between an engaged and disengaged position; a series of pinion gears spaced around the path of the travel of the segment gear for driving engagement by said segment gear; drive connection means interposed between the respective pinion gears and said wire joining means, wire gripping means, needle means, and severing means, whereby to drive the elements of said band forming mechanism in timed sequence when said segment gear is rotated; and said segment gear having a cam surface integral therewith to move said clutch to its disengaged position to insure the discontinuance of the drive to said segment gear after the completion of its one revolution.

11. A baler having a source of power and a driven compressing plunger and including cooperating wire gripping and needle means operative from opposite sides of the compression chamber for the hay or the like to assist in the forming of a wire band around the bale, and means to receive the ends of the strand of wire to be formed into the band by joining them together, and then severing the completed band from the wire supply to complete the bale formation and banding cycle; comprising a unitary drive system for timing the motion and driving said band forming means; said drive system having a driven segment gear; means having motion imparted thereto by the plunger drive to drive said segment gear; a series of pinion gears spaced around the path of the travel of the segment gear for driving engagement by said segment gear; and drive connection means interposed between the respective pinion gears and said wire joining means, wire gripping means, needle means, and severing means, whereby to drive the elements of said band forming mechanism in timed sequence when said segment gear is rotated.

12. A baler including cooperating wire gripping and needle means operative from opposite sides of a compression chamber for hay or the like, to assist in the forming of a wire band around the bale, and means to receive the ends of the strand of wire to be formed into the band by joining them together, and then severing the completed band from the wire supply to complete the bale formation and banding cycle; comprising means to measure the length of the material being compressed in the chamber and a tripping mechanism associated therewith to initiate operation of the banding means; a unitary drive system for timing the motion and driving said band forming means; said drive system having a driven segment gear; means to drive said segment gear through one revolution only during each banding cycle, including a clutch on the segment gear moveable between an engaged and disengaged position; said tripping mechanism being operatively connected to said clutch; a series of pinion gears spaced around the path of the travel of the segment gear for driving engagement by said segment gear; and drive connection means interposed between the respective pinion gears and said wire joining means, wire gripping means, needle means, and severing means, whereby to drive the elements of said band forming mechanism in timed sequence when said clutch becomes engaged and said segment gear is rotated.

13. In an automatic hay baler including a wire banding mechanism of the class in which a needle mechanism delivers a loop of wire around the end of a bale to a wire carrier which moves past a twister to lay one strand of the loop in the twister in lapped relation to a previously layed free end of wire extending from said loop, the combination comprising means for actuating said needle mechanism and said wire carrier in coordinated relation to lay the wire in said twister, means for moving said twister to projected position to receive the wire, means actuating the twister to perform a twisting cycle following reception of the wire therein, and means actuated from said wire carrier actuating means for moving said twister to retracted position following completion of the twisting cycle.

14. In an automatic hay baler including a tying mechanism of the class in which a needle mechanism delivers a wire around the end of a completed bale to a wire carrier which lays it in a twister, the combination comprising means for supporting the twister for bodily movement between retracted and projected positions, means for actuating said needle mechanism and said wire carrier in coordinated relation, to lay the wire in said twister, means for moving said twister to projected position to receive said wire, means actuated from said needle actuated means for moving said twister to retracted position following completion of the twisting cycle, and means actuating the twister to twist together the wires therein, following the reception of the said wires and before retraction of the twister.

15. In an automatic hay baler including a tying mechanism of the class in which a needle mechanism delivers a wire around the end of a completed bale to a wire carrier which lays it in a twister, the combination comprising means supporting the twister for bodily movement between retracted and projected positions, a drive element, means operatively connecting said needle mechanism and said wire carrier to said drive element for actuation in coordinated relation to lay the wire in said twister, means for moving said twister to projected position to receive said wire, means actuated from said drive element for moving said twister to retracted position following completion of the twisting cycle, and means actuating the twister to twist together the wires therein following reception of the said wires and before retraction of the twister.

16. In an automatic hay baler including a tying mechanism of the class in which a needle mechanism delivers a wire around the end of a completed bale to a wire carrier which lays it in a twister, the combination comprising a stationary stripper, a housing carrying said twister being movable from a retracted position past said stripper to a projected position beyond said stripper, a drive element, means operatively connecting said needle mechanism and said wire carrier to said drive element for actuation in coordinated relation to lay the wire in said twister, and means actuated from said same drive element for projecting the housing beyond the stripper to receive the wire from said carrier, and for then retracting said housing past said stripper to remove the wire from the twister upon completion of the twist, and means actuating the twister following reception of the wire therein and before retraction thereof.

17. In an automatic hay baler including a wire banding mechanism of the class in which a needle delivers a loop of wire around the end of a completed bale to a wire carrier which moves past a twister to lay one strand of the loop in the twister in lapping relation to a previously layed free end of wire extending from said strand, the combination comprising a drive element, means operatively connecting said needle and said wire carrier to said element for actuation in coordinated relation to lay the wire in said twister, a spring projected wire separator disposed between said twister and the path of movement of said wire carrier, a latch normally retaining said separator in a retracted inoperative position, a control element for said latch being disposed for operative engagement by said carrier to release the latch for projection between the strands of the wire loop extending from said carrier to bar one of said strands from entry into the twister, means actuated from said drive element for causing bodily movement of the twister following completion of the twisting cycle, and means carried by the twister for retracting said wire separator incident to said bodily movement.

18. In an automatic hay baler including a wire banding mechanism of the class in which a needle delivers a loop of wire around the end of a completed bale to a movable wire carrier which lays one strand of the loop in a twister in lapping relation to a previously layed free end of wire extending from said loop, the combination comprising a spring projected wire separator disposed between said twister and the path of movement of said wire carrier, a latch normally retaining said separator in a retracted inoperative position, a control element for said latch being disposed for operative engagement by said carrier to release the latch for projection between the strands of the wire loop extending from said carrier to bar one of said strands from entry into the twister, means for causing bodily movement of the twister following completion of the twisting cycle, and means carried by the twister for retracting said wire separator incident to such bodily movement.

19. In an automatic hay baler including a wire banding mechanism of the class in which a needle delivers a loop of wire around the end of a completed bale to a wire carrier which lays one strand of the loop in a twister in lapping relation to a previously layed free end of wire extending from said loop the combination comprising a stripper, a housing supporting said twister for movement past said stripper, means for projecting said housing beyond said stripper whereby the twister may receive and twist said wire, and for retracting said housing past said stripper to remove the wire from the twister following completion of the twisting cycle, a spring projected wire separator disposed in front of said twister, a latch normally maintaining said wire separator in a retracted inoperative position, a control element for said latch being disposed for operative engagement by said carrier to release the latch at such point in the path of movement of the carrier as will cause the separator to project between the strands of the wire loop extending from said carrier to bar one of said strands from entry into the twister, and means carried by the twister housing for retracting said separator incident to the retraction of said twister at the end of the twisting cycle.

20. In a pick-up baler having means to compress hay into a bale form, means to band the formed hay with at least one strand of wire by twisting the ends of the wire strands together to complete the band, and movable means for cutting the ends of the wire strands the improvement comprising fixed stripper means separate from said movable cutting means, a bodily movable twister disposed adjacent said stripper means, means guiding said twister for substantially linear bodily movement relative to said stripper means, and means to relatively project the twister beyond said stripper means before initiation of a twisting cycle and then to retract said twister past said stripper means upon completion of a twisting cycle.

References Cited in the file of this patent

UNITED STATES PATENTS

| Number | Name | Date |
|---|---|---|
| 689,111 | McKaig | Dec. 17, 1901 |
| 971,616 | Jackson | Oct. 4, 1910 |
| 994,662 | Schubert | June 6, 1911 |
| 1,120,346 | Tibbe et al. | Dec. 8, 1914 |
| 1,309,168 | Wygant | July 8, 1918 |
| 1,512,532 | Grieves | Oct. 21, 1924 |
| 1,631,881 | Murray | June 7, 1927 |
| 1,863,648 | Bernard | June 21, 1932 |
| 1,889,372 | Nolan | Nov. 29, 1932 |
| 1,968,166 | Phythian et al. | July 31, 1934 |
| 2,236,628 | Nolt | Apr. 1, 1941 |
| 2,277,394 | Everhart et al. | Mar. 24, 1942 |
| 2,387,535 | Sewell | Oct. 23, 1945 |
| 2,400,555 | Johnston | May 21, 1946 |
| 2,403,396 | Raney | July 2, 1946 |
| 2,450,082 | Crumb et al. | Sept. 28, 1948 |
| 2,456,476 | West et al. | Dec. 14, 1948 |
| 2,470,278 | West et al. | May 17, 1949 |
| 2,499,615 | Tuft | Mar. 7, 1950 |
| 2,509,996 | Tallman | May 30, 1950 |
| 2,513,690 | Tranter et al. | July 4, 1950 |
| 2,528,538 | Nolt | Nov. 7, 1950 |
| 2,529,842 | Jones et al. | Nov. 14, 1950 |
| 2,545,579 | Hill et al. | Mar. 20, 1951 |
| 2,546,324 | Tuft et al. | Mar. 27, 1951 |
| 2,548,559 | Ronning et al. | Apr. 10, 1951 |